US007903890B2

(12) United States Patent
Nagano et al.

(10) Patent No.: US 7,903,890 B2
(45) Date of Patent: Mar. 8, 2011

(54) IMAGE PROCESSING DEVICE, LEARNING DEVICE, AND COEFFICIENT GENERATING DEVICE AND METHOD

(75) Inventors: Takahiro Nagano, Kanagawa (JP); Tetsujiro Kondo, Tokyo (JP); Tsutomu Watanabe, Kanagawa (JP); Junichi Ishibashi, Saitama (JP); Hisakazu Shiraki, Kanagawa (JP); Naoki Fujiwara, Tokyo (JP); Masanori Kanemaru, Kanagawa (JP); Shinichiro Kaneko, Tokyo (JP); Yasuhiro Suto, Tokyo (JP)

(73) Assignee: Sony Corporation, Tokyo (JP)

( * ) Notice: Subject to any disclaimer, the term of this patent is extended or adjusted under 35 U.S.C. 154(b) by 929 days.

(21) Appl. No.: 11/722,450

(22) PCT Filed: Dec. 21, 2005

(86) PCT No.: PCT/JP2005/024008
§ 371 (c)(1),
(2), (4) Date: Jun. 21, 2007

(87) PCT Pub. No.: WO2006/068298
PCT Pub. Date: Jun. 29, 2006

(65) Prior Publication Data
US 2008/0008356 A1 Jan. 10, 2008

(30) Foreign Application Priority Data
Dec. 21, 2004 (JP) ................................ 2004-369264

(51) Int. Cl.
*G06K 9/46* (2006.01)
*G06K 9/62* (2006.01)
*G06K 9/40* (2006.01)
*H04N 11/04* (2006.01)

(52) U.S. Cl. .... 382/238; 382/255; 382/224; 375/240.12; 375/240.13; 375/240.15; 375/240.16

(58) Field of Classification Search .................. 382/238, 382/255, 224; 375/240.12
See application file for complete search history.

(56) References Cited

U.S. PATENT DOCUMENTS
5,852,565 A * 12/1998 Demos .......................... 708/203
(Continued)

FOREIGN PATENT DOCUMENTS
JP 2001 250119 9/2001
(Continued)

*Primary Examiner* — Bhavesh M Mehta
*Assistant Examiner* — Utpal Shah
(74) *Attorney, Agent, or Firm* — Oblon, Spivak, McClelland, Maier & Neustadt, L.L.P.

(57) ABSTRACT

A target-pixel-setting section (31) sets a target pixel in a target image to be predicted. A motion-direction-detecting section (32) detects a motion direction corresponding to the target pixel. A pixel-value-extracting section (36) extracts from peripheral images corresponding to the target image, in order to extract a main term that mainly contains component of the target pixel in a moving object that encounters a motion blur in the peripheral images, at least pixel values of pixels in the peripheral images whose space position roughly agree with space position of the target pixel. A processing-coefficient-setting section (37a) sets a specific motion-blur-removing-processing coefficient. A pixel-value-generating section (38a) newly generates pixel values for processing from the pixel values extracted by the pixel-value-extracting section (36) corresponding to the motion direction and generates pixel values corresponding to the target pixel based on the pixel values for processing and the specific motion-blur-removing-processing coefficients. It is possible to perform a robust motion-blur-removing processing on any shifts of motion vector.

20 Claims, 24 Drawing Sheets

U.S. PATENT DOCUMENTS

| | | | |
|---|---|---|---|
| 6,442,203 B1 * | 8/2002 | Demos | 375/240.16 |
| 6,466,624 B1 * | 10/2002 | Fogg | 375/240.27 |
| 6,570,624 B2 * | 5/2003 | Cornog et al. | 348/446 |
| 7,024,050 B2 * | 4/2006 | Kondo et al. | 382/254 |
| 7,583,292 B2 * | 9/2009 | Kondo et al. | 348/208.4 |
| 2006/0072664 A1 * | 4/2006 | Kwon et al. | 375/240.16 |

FOREIGN PATENT DOCUMENTS

| | | |
|---|---|---|
| JP | 2002 373336 | 12/2002 |
| JP | 2003 233817 | 8/2003 |

* cited by examiner

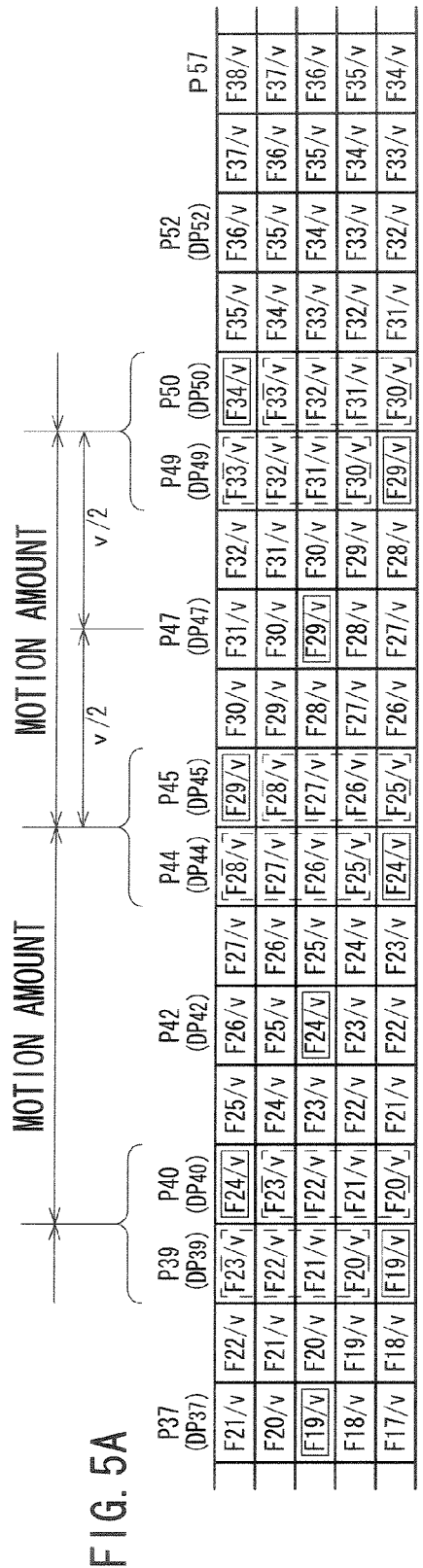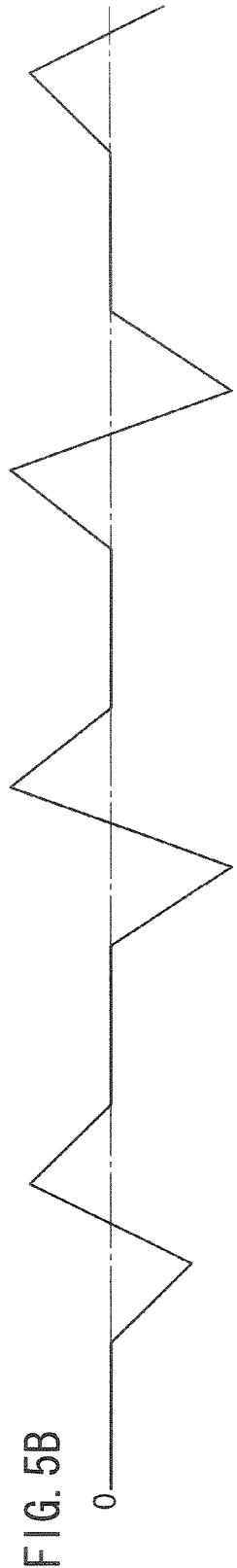
F I G. 5A
F I G. 5B

FIG. 25

| $DP_{L-U}$ | $DP_{C-U}$ | $DP_{R-U}$ |
|---|---|---|
| $DP_L$ | $DP_C$ | $DP_R$ |
| $DP_{L-L}$ | $DP_{C-L}$ | $DP_{R-L}$ |

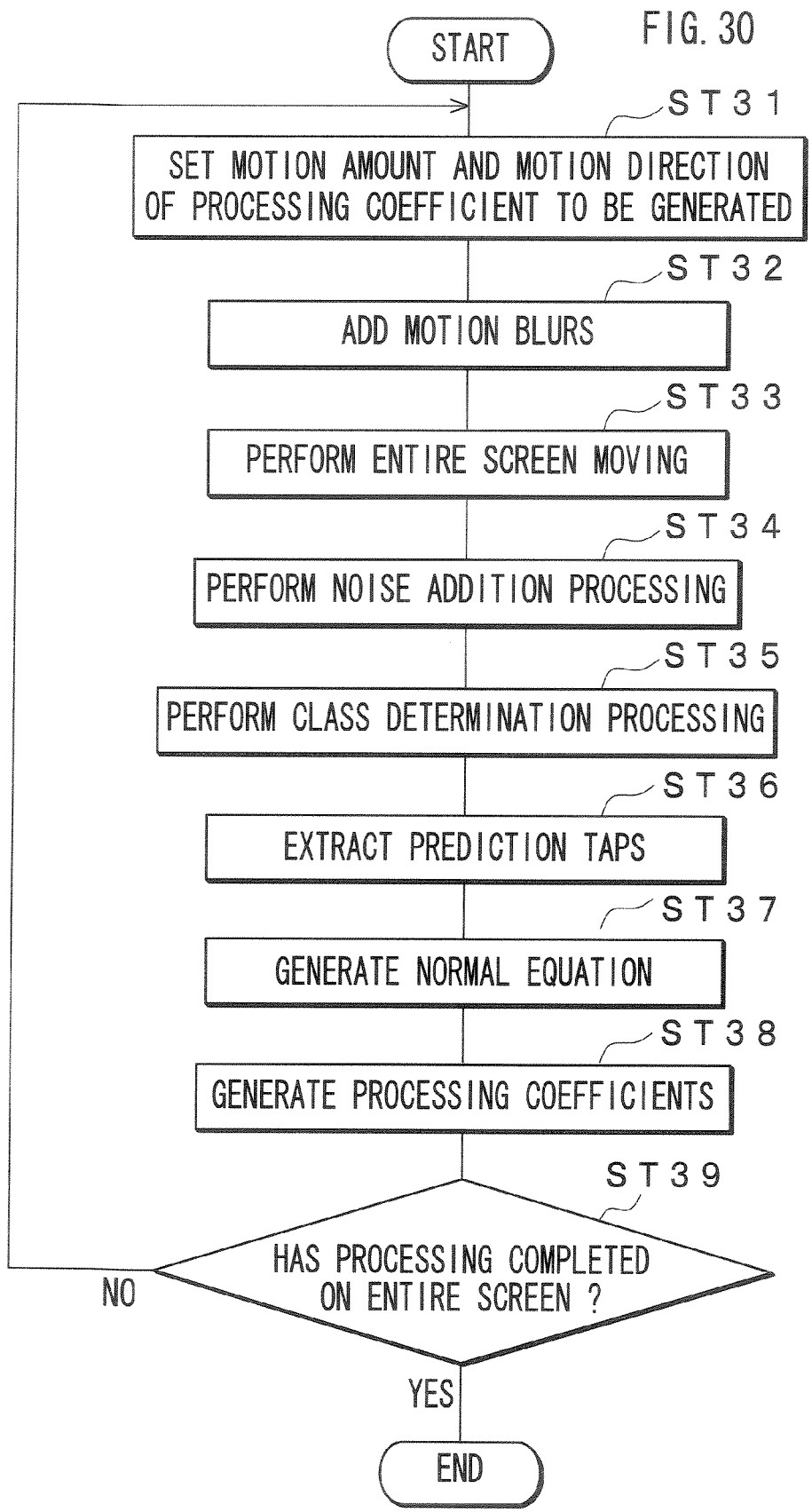

IMAGE PROCESSING DEVICE, LEARNING DEVICE, AND COEFFICIENT GENERATING DEVICE AND METHOD

TECHNICAL FIELD

The present invention relates to an image-processing apparatus, a learning apparatus, a coefficient-generating apparatus and their methods. More specifically, in order to extract a main term that mainly contains components of a target pixel in a moving object that encounters a motion blur in a target image, at least pixel values of pixels in peripheral images, which correspond to the target image, whose space positions roughly agree with that of the target pixel are extracted from the peripheral images and then, a motion-blur-removed pixel value of the target pixel is generated from the processing coefficients set corresponding to a motion direction of the target pixel and the extracted pixel values. Further, these processing coefficients are learned.

BACKGROUND ART

Conventionally, an event in a real world has been converted into data by using a sensor. The data acquired by using the sensor is information that is obtained by projecting information of the real world (e.g., light) onto a space and time having a lower number of dimensions than the real world. Accordingly, the information obtained by projection has distortion that occurs through projection. For example, in the case of imaging, by using a video camera, a moving object in front of a background at rest and converting it into data as an image signal, information of the real world is sampled and converted into data, so that an image which is displayed on the basis of the image signal encounters a motion blur that the moving object blurs as distortion that occurs through projection.

Accordingly, as disclosed in Japanese Patent Application Publication No. 2001-250119 (Corresponding U.S. patent application Ser. No. 09/830,858, Corresponding EP Patent Application Publication No. EP1164545), for example, by detecting a profile of an image object that corresponds to an object in a foreground contained in an input image, the image object that corresponds to the object in the foreground is coarsely extracted to detect a motion vector of the image object corresponding to the object in the foreground that is coarsely extracted, so that the detected motion vector and its position information may be used to remove a motion blur.

DISCLOSURE OF THE INVENTION

By the way, in the conventional motion blur removing, any space processing corresponding to a blur amount of a portion of an input signal at which a motion blur occurs has been performed, thereby enabling the blur to be removed. Spatially completed processing similar to it, however, has been also performed on a motion image, so that accuracy of motion-blur-removing processing has been very deeply influenced by accuracy of estimation of motion vector. In other words, if estimated motion vector is shifted, processing regions and/or processing coefficients to be used in motion blur removing vary, so that a motion-blur-removing processed image may have a danger of failure. Further, if any time information is also used, the estimated motion vector is further shifted, so that any information on time direction cannot be utilized for such the processing usefully.

An image-processing apparatus according to the invention comprises a target-pixel-setting section that sets a target pixel in a target image to be predicted, a motion-direction-detecting section that detects a motion direction corresponding to the target pixel, a pixel-value-extracting section that extracts from a peripheral image corresponding to the target image, in order to extract a main term that mainly contains component of the target pixel in a moving object that encounters a motion blur in the peripheral image, at least a pixel value of pixel in the peripheral image whose space position roughly agrees with space position of the target pixel, a processing-coefficient-setting section that sets a motion-blur-removing-processing coefficient that corresponds to the motion direction detected by the motion-direction-detecting section or sets a specific motion-blur-removing-processing coefficient, and pixel-value-generating section that generates a pixel value that corresponds to the target pixel based on the pixel value extracted by the pixel-value-extracting section and the motion-blur-removing-processing coefficient set by the processing-coefficient-setting section, or newly generates a pixel value for processing from the extracted pixel value that corresponds to the motion direction and generates a pixel value corresponding to the target pixel based on the pixel value for processing and the specific motion-blur-removing-processing coefficient.

An image-processing method according to the invention comprises a target-pixel-setting step of setting a target pixel in a target image to be predicted, a motion-direction-detecting step of detecting a motion direction corresponding to the target pixel, a pixel-value-extracting step of extracting from a peripheral image corresponding to the target image, in order to extract a main term that mainly contains component of the target pixel in a moving object that encounters a motion blur in the peripheral image, at least a pixel value of pixel in the peripheral image whose space position roughly agrees with space position of the target pixel, a processing-coefficient-setting step of setting a motion-blur-removing-processing coefficient that corresponds to the motion direction detected in the motion-direction-detecting step or setting a specific motion-blur-removing-processing coefficient, and a pixel-value-generating step of generating a pixel value that corresponds to the target pixel based on the pixel value extracted in the pixel-value-extracting step and the motion-blur-removing-processing coefficient set in the processing-coefficient-setting step, or newly generating a pixel value for processing from the extracted pixel value that corresponds to the motion direction and generating a pixel value corresponding to the target pixel based on the pixel value for processing and the specific motion-blur-removing-processing coefficient.

A learning apparatus according to the invention comprises a motion-amount-setting section that sets a motion amount, a motion-direction-setting section that sets a motion direction, a student-image-generating section that adds a motion blur to a teacher image based on the motion amount set by the motion-amount-setting section and the motion direction set by the motion-direction-setting section, to generate a student image, a prediction-tap-extracting section that extracts, in order to extract a main term that mainly contains component of the target pixel in a moving object that encounters a motion blur in the student image, at least a pixel value of pixel in the student image whose space position roughly agrees with space position of the target pixel in the teacher image, and a processing-coefficient-generating section that generates a processing coefficient for predicting the target pixel in the teacher image from the pixel value of the pixel extracted from the prediction-tap-extracting section at least for each motion direction or generates a single processing coefficient that corresponds to a specific motion amount and a specific motion direction.

A learning method according to the invention comprises a motion-amount-setting step of setting a motion amount, a motion-direction-setting step of setting a motion direction, a student-image-generating step of adding a motion blur to a teacher image based on the motion amount set in the motion-amount-setting step and the motion direction set in the motion-direction-setting step, to generate a student image, a prediction-tap-extracting step of extracting, in order to extract a main term that mainly contains component of the target pixel in a moving object that encounters a motion blur in the student image, at least a pixel value of pixel in the student image whose space position roughly agrees with space position of the target pixel in the teacher image, and a processing-coefficient-generating step of generating a processing coefficient for predicting the target pixel in the teacher image from the pixel value of the pixel extracted in the prediction-tap-extracting step at least for each motion direction or generating a single processing coefficient that corresponds to a specific motion amount and a specific motion direction.

A coefficient-generating apparatus according to the invention comprises a motion-amount-setting section that sets a motion amount, a motion-direction-setting section that sets a motion direction, and a processing-coefficient-generating section that constructs a model constituted of at least two images to each of which a motion blur is added based on the motion amount set by the motion-amount-setting section and the motion direction set by the motion-direction-setting section, generates a matrix of accumulation characteristics of pixel values of peripheral pixels in two images that have roughly the same space position as that of a target pixel located between two images and a constraint of inter-adjacent pixel difference=0, and obtains a coefficient multiplied with the peripheral pixels in which a motion blur occurs when the target pixel from which the motion blur is removed is obtained from the peripheral pixels having motion blur by calculation of the matrix to set it as processing coefficient.

A coefficient-generating method according to the invention comprises a motion-amount-setting step of setting a motion amount, a motion-direction-setting step of setting a motion direction, and a processing-coefficient-generating step of constructing a model constituted of at least two images to each of which a motion blur is added based on the motion amount set in the motion-amount-setting step and the motion direction set in the motion-direction-setting step, generating a matrix of accumulation characteristics of pixel values of peripheral pixels in two images that have roughly the same space position as that of a target pixel located between two images and a constraint of inter-adjacent pixel difference=0, and obtaining a coefficient multiplied with the peripheral pixels in which a motion blur occurs when the target pixel from which the motion blur is removed is obtained from the peripheral pixels having motion blur by calculation of the matrix to set it as processing coefficient.

In the present invention, a target pixel in a target image to be predicted is set and, from peripheral images corresponding to the target image, in order to extract a main term that mainly contains component of the target pixel in a moving object that encounters a motion blur in the peripheral images, at least pixel values of pixels in the peripheral images whose space positions roughly agree with a space position of the target pixel are extracted. In this pixel value extracting, pixel values of first plural pixels in the peripheral images are extracted when the peripheral images have an interlace format, and pixel values of second plural pixels in the peripheral images are extracted when the peripheral images have a progressive format. A pixel value corresponding to the target pixel is generated based on the extracted pixel values and the motion-blur-removing-processing coefficients. Alternatively, pixel values for processing are newly generated from the extracted pixel values that correspond to the motion direction and the pixel value corresponding to the target pixel is generated based on the pixel values and the specific motion-blur-removing-processing coefficients. Alternatively, the pixel value corresponding to the target pixel is generated based on the extracted pixel values and the motion-blur-removing-processing coefficients corresponding to the motion direction. Further, a class of the target pixel is determined corresponding to an activity of pixel values of the pixels in the peripheral images and the processing coefficients corresponding to the determined class are utilized.

The processing coefficients are also generated through learning. In the learning of processing coefficients, a motion blur is added to a teacher image to generate student images, and in order to extract a main term that mainly contains component of the target pixel in a moving object that encounters a motion blur in the student images, at least pixel values of pixels in the student images whose space position roughly agrees with space position of the target pixel in the teacher image are extracted, and prediction coefficients for predicting the target pixel in the teacher image are generated as processing coefficients from the extracted pixel values of pixels.

Alternatively, by constructing a model constituted of images, to each of which a motion blur is added, a matrix is generated by its accumulation characteristics and a constraint of inter-adjacent pixel difference=0, and a coefficient multiplied with the pixels in which a motion blur occurs when the target pixel from which the motion blur is removed is obtained from the pixels having motion blur is set as a processing coefficient by calculation of the matrix.

EFFECTS OF THE INVENTION

According to the present invention, a target pixel in a target image to be predicted is set, and from peripheral images corresponding to the target image, in order to extract main terms that mainly contain component of the target pixel in a moving object that encounters a motion blur in the peripheral images, at least pixel values of pixels in the peripheral images whose space positions roughly agree with space position of the target pixel are extracted. The pixel value corresponding to the target pixel can be generated based on the extracted pixel values and the motion-blur-removing-processing coefficients.

Thus, in order to extract main terms from the peripheral images, at least pixel values of pixels in the peripheral images whose space positions roughly agree with space position of the target pixel are extracted to be used for generating the pixel value corresponding to the target pixel, so that the extracted pixel values can be fluctuated at a little even if an error occurs in, for example, detection of the motion vector, thereby enabling very robust motion blur removing to be realized against the error in the detection of the motion vector.

Further, since pixel values of first plural pixels in the peripheral images are extracted when the peripheral images have an interlace format or pixel values of second plural pixels in the peripheral images are extracted when the peripheral images have a progressive format, it is possible to remove the motion blur in spite of format of the peripheral image. Additionally, by determining the class of the target pixel corresponding to the activity of the pixel values of pixels in the peripheral images corresponding to the target pixel in the target image, it is possible to remove the motion blur more accurately using the processing coefficients corresponding to a space correlation with the target pixel.

The processing coefficients are also generated through the learning using the teacher image and the student images, so that by using the teacher image and the student images, which have a desired image format, it is possible to generate the processing coefficients that are suitable for the motion blur removing, in spite of the image format.

BRIEF DESCRIPTION OF THE DRAWINGS

FIGS. 5A and 5B are diagrams each for explaining calculation operations for a pixel value of a target pixel;

FIG. 25 is a diagram for explaining calculation of an activity;

FIG. 30 is a flowchart for showing learning processing.

BEST MODE FOR CARRYING OUT THE INVENTION

Figure 1:
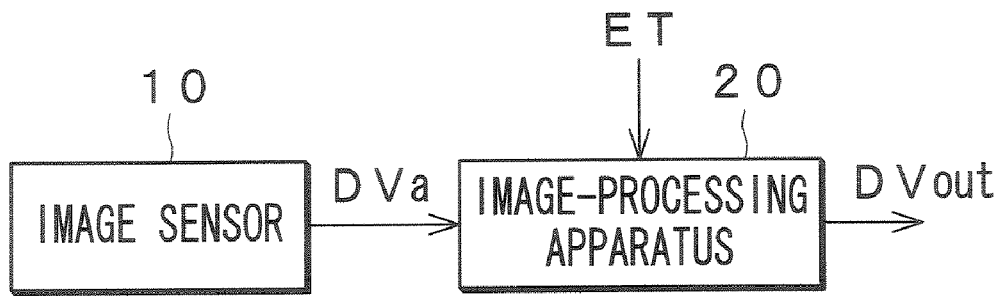
FIG. 1 is a diagram for showing a system configuration.

The following will describe one embodiment of the present invention with reference to drawings. FIG. 1 is a block diagram for showing a configuration of a system to which the present invention is applied. An image sensor 10 generates an image signal DVa by picking up an image of a real society to supply it to an image-processing apparatus 20. The image-processing apparatus 20 extracts information embedded in the supplied image signal DVa of an input image to generate an image signal from which the embedded information is extracted and outputs it. It is to be noted that the image-processing apparatus 20 is also configured so that it can extract the information embedded in the image signal DVa by using a variety of pieces of information ET supplied from outside.

Figure 2:
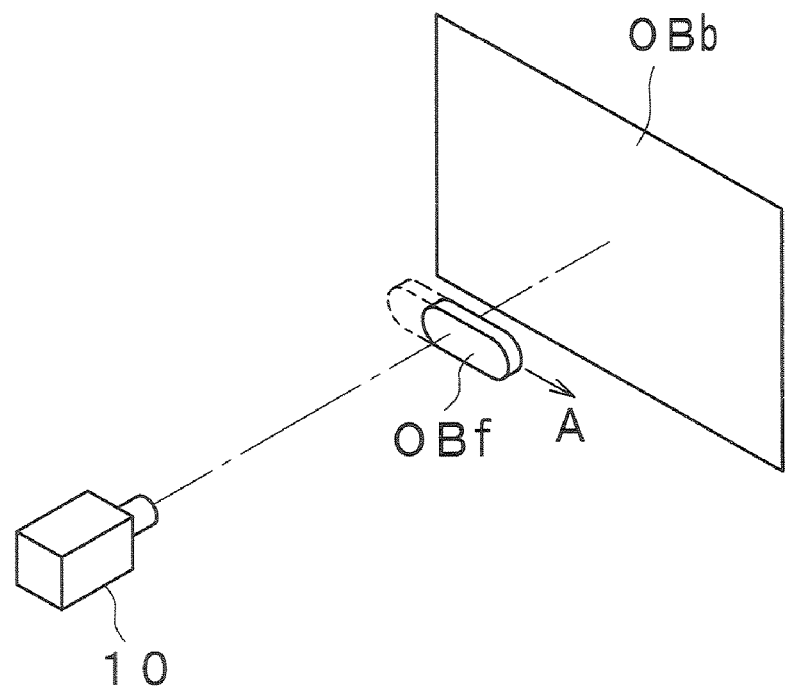
FIG. 2 is an illustration for explaining how an image sensor picks up an image.

The image sensor 10 is constituted of a video camera or the like that is equipped with a charge-coupled device (CCD) area sensor and an MOS area sensor, which are a solid-state image pick-up device, and picks up an image of a real society. For example, as shown in FIG. 2, when a moving object OBf that corresponds to a foreground is moving in a direction of an arrow A between the image sensor 10 and an object OBb that corresponds to a background, the image sensor 10 picks up an image of the moving object OBf that corresponds to the foreground together with an image of the object OBb that corresponds to the background.

A detection element in the image sensor 10 converts an input light into charges during a period of time corresponding to a period of exposure time and accumulates thus photo-electrically converted charges. A quantity of the charges is roughly proportional to an intensity of the input light and a period of time when the light is being input. During the period of time corresponding to the period of exposure time, the detection element adds charges converted from the input light to already accumulated charges. In other words, during the period of time corresponding to the period of exposure time, the detection element integrates the input light and accumulates a quantity of charges that corresponds to the integrated light. The detection element may be also said to have an integration effect on time. By, thus, performing photo-electric conversion by using the image sensor, the input light is converted into charges for each pixel, which are accumulated for each unit of the period of exposure time. A pixel signal is generated in accordance with the quantity of thus accumulated charges and then, by using this pixel signal, an image signal having a desired frame rate is generated, which is supplied to the image-processing apparatus. It is to be noted that the period of exposure time for the image sensor is a period of time when, as described above, the image sensor converts the input light into charges and accumulates them in its detection element and equal to an image time interval (e.g., a period of time for one frame) in a case where the shutter is not operated. It is also equal to a period of shutter-open time in a case where the shutter is operated.

Figure 3:
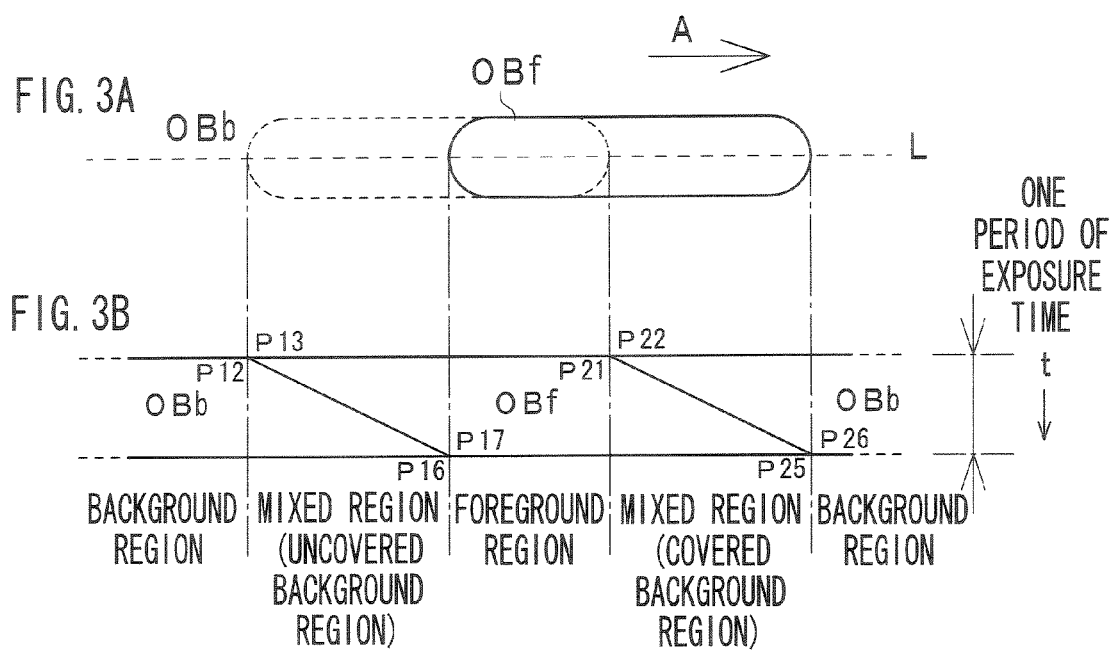
FIGS. 3A and 3B are diagrams each for explaining a picked-up image.

FIGS. 3A and 3B are diagrams each for explaining a picked-up image represented by an image signal. FIG. 3A shows an image obtained by picking up an image of a moving object OBf that corresponds to the moving foreground and an image of an object OBb that corresponds to the still background. It is to be noted that the moving object OBf that corresponds to the foreground is supposed to be moving horizontally in a direction of an arrow A.

FIG. 3B shows a relationship between the image and time at a position on line L, which is indicated by broken lines, extending in the direction of the arrow A as shown in FIG. 3A. If a length of the moving object OBf in its motion direction on the line L is, for example, nine pixels and the moving object OBf moves as much as five pixels in one period of exposure time, its front end that has stayed at pixel position P21 and its rear end that has stayed at pixel position P13, at the beginning of a period of frame period, respectively move to pixel positions P25 and P17 at the end of the period of exposure time. Further, if the shutter is not operated, a period of exposure time for one frame is equal to one period of frame time, so that the front end moves to pixel position P26 and the rear end moves to pixel position P18, at the beginning of the next period of frame time.

Accordingly, in the period of frame time on the line L, a portion up to pixel position P12 and a portion from pixel position P26 each provide a background region that is constituted of a background component only. A portion between the pixels positions P17 and P21 provides a foreground region constituted of a foreground component only. A portion between the pixel positions P13 and P16 and a portion between the pixel positions P22 and P25 each provide a mixed region in which a foreground component and a background component are mixed. The mixed regions are classified into a covered background region in which a background component is covered by a foreground as time elapses and an uncovered background region in which a background component appears as time elapses. It is to be noted that in FIG. 3B, a mixed region positioned on the front end side of the foreground object OBf in its traveling direction provides a covered background region and a mixed region positioned on its rear end side in its traveling direction provides an uncovered background region. Thus, an image signal contains an image that includes a foreground region, background regions, or a covered background region or an uncovered background region.

Figure 4:
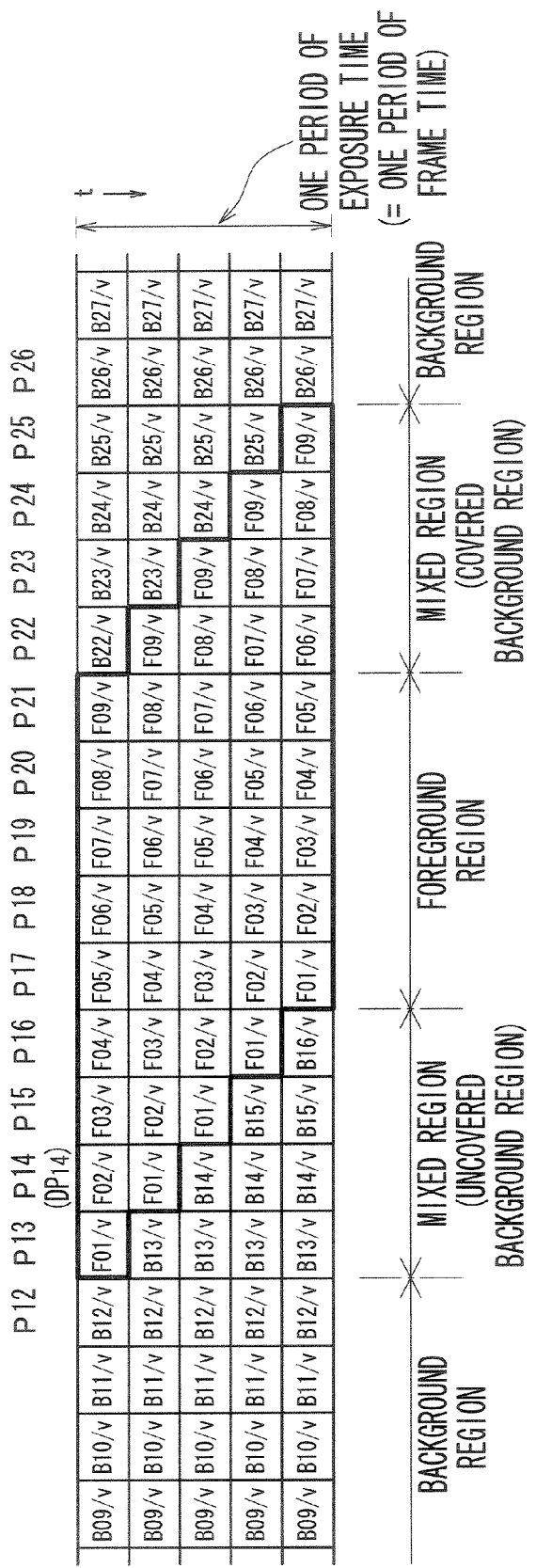
FIG. 4 is a diagram for showing operations for dividing pixel values in a time direction.

Herein, on the assumption that an image time interval is short and that the moving object OBf that corresponds to the foreground is a rigid body and moves with uniform speed, operations for dividing pixel values on the line L time-directionally are performed as shown in FIG. 4. In these operations for time-directional division, a pixel value is developed in the time direction and divided by a virtual divisor into equal time intervals. It is to be noted that in FIG. 4, a vertical axis represents time, to indicate that time elapses downward in the figure.

The virtual divisor is set to one corresponding to a motion amount v or the like of a moving object that corresponds to the foreground in an image time interval. For example, if the motion amount v in one period of frame time corresponds to five pixels as described above, the virtual divisor is set to "5" corresponding to the motion amount v, to divide one period of frame time into five equal time intervals.

Further, pixel values, during one period of frame time, of pixel position Px obtained when the object OBb that corresponds to the background is picked up are supposed to be Bx and pixel values obtained at the pixels when the moving object OBf having a nine-pixel length on the line L, which corresponds to the foreground, is picked up with it being at rest are supposed to be F09 (on the front end side) through F01 (on the rear end side).

In this case, for example, pixel value DP14 at pixel position P14 is given by Equation 1:

$$DP14 = B14/v + B14/v + B14/v + F01/v + F02/v \quad (1)$$

At this pixel position P14, three virtual time dividends (a period of frame time/v) of the background component and two virtual time dividends of the foreground component are contained and so, a mixture ratio α of the background component with respect to the pixel values is ⅗. Similarly, for example, at pixel position P22, one virtual time dividend of the background component and four virtual time dividends of the foreground component are contained and so, a mixture ratio α therewith is ⅕.

Thus, element of the foreground is moved so that in one period of exposure time, elements of the different foregrounds are added, and therefore, region of the foreground that corresponds to the moving object contains a motion blur. Accordingly, in the image-processing apparatus 20, significant information embedded in the image signal DVa is extracted and so, the image signal DVout from which a motion blur of the moving object OBf corresponding to the foreground is removed is generated.

Herein, the following will describe operations of calculating a pixel value of a target pixel on an image with reference to FIGS. 5A and 5B. For example, in the case of obtaining a pixel position F29 of a target pixel in the moving object OBf, Equation 2 holds true, with taking a pixel position P47 containing the element F29/v of the target pixel into consideration as a pixel of interest that is to be processed, on a pixel position P45 where an element F29/v of the target pixel appears first and a pixel position P44 which is adjacent to the pixel position P45 and does not have the element F29/v of the target pixel, as indicated by broken lines.

$$F29 - F24 = (DP45 - DP44) \times v \quad (2)$$

Similarly, Equation 3 holds true on a pixel position P49 where an element F29/v of the target pixel appears last and a pixel position P50 which is adjacent to the pixel position P49 and does not have the element F29/v of the target pixel as indicated by broken lines.

$$F34 - F29 = (DP50 - DP49) \times v \quad (3)$$

Namely, the pixel value F29 of the target pixel can be calculated by using the pixel values DP44, DP45 of the pixel positions P44, P45 and pixel value F24 or the pixel values DP49, DP50 of the pixel positions P49, P50 and pixel value F34.

Further, with taking into consideration that the pixel value F24 can be also calculated similar to that of the pixel value F29 of the target pixel, Equation 4 holds true on a pixel position P40 where an element F24/v appears first and a pixel position P39 which is adjacent to the pixel position P40 and does not have the element F24/v, as indicated by broken lines.

$$F24 - F19 = (DP40 - DP39) \times v \quad (4)$$

Thus, the pixel value F29 can be further calculated by using pixel values DP39, DP40, DP44, and DP45 of the pixel positions P39, P40, P44, and P45, and pixel value F19. Similarly, the pixel value F34 can be also calculated.

Based on the results above, pixel positions, difference of which is to be obtained, repeatedly appear with an interval of the motion amount. In other words, the pixel value F29 of the target pixel can be calculated by using the pixel values of the pixel positions, difference of which is to be obtained, P39, P40, P44, P45, P49, P50 and so on.

Figure 6:
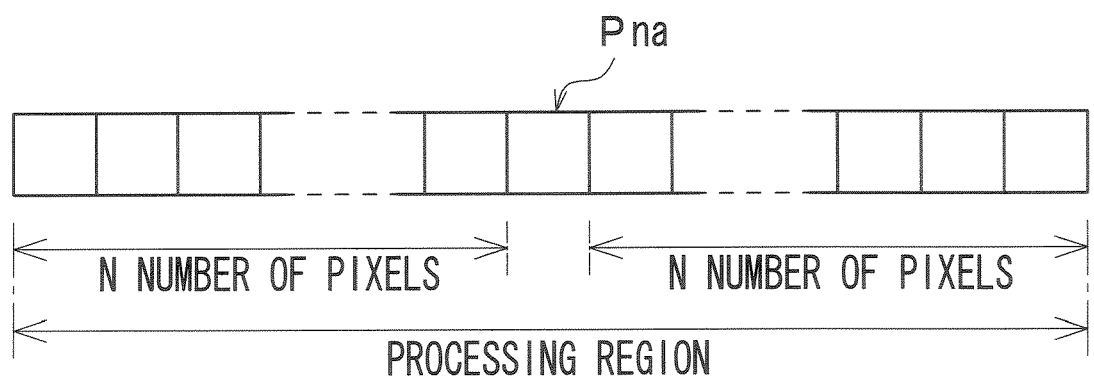
FIG. 6 is a diagram for showing a processing region.
Figure 7A:
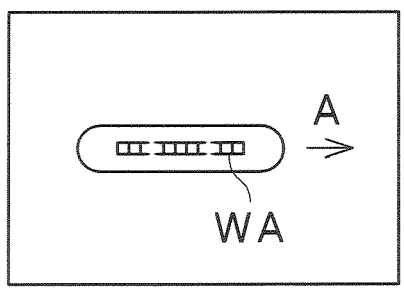
FIGS. 7A and 7B are illustrations each for illustrating an example of setting the processing region.
Figure 7B:
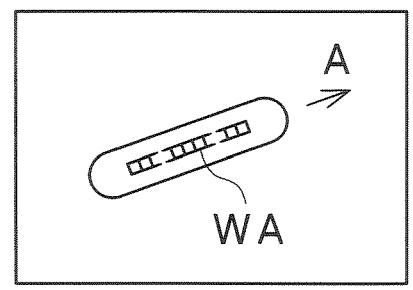

The following describe a case of calculating a pixel value of a target pixel by using model equations. Herein, as shown in FIG. 6, a processing region of (2N+1) number of pixels is set in a motion direction as a center of a target pixel Pna. FIGS. 7A and 7B show setting examples of processing regions, in which a processing region WA is set horizontally as shown in FIG. 7A when a direction of a motion vector is, for example, horizontal as indicated by an arrow A with respect to a pixel of a moving object OBf whose motion blurs are to be removed. When a direction of a motion vector is oblique, as shown in FIG. 7B, a processing region WA is set in a corresponding angle. However, when setting the processing region obliquely, a pixel value that corresponds to a pixel position in the processing region is obtained by interpolation etc.

Figure 8:
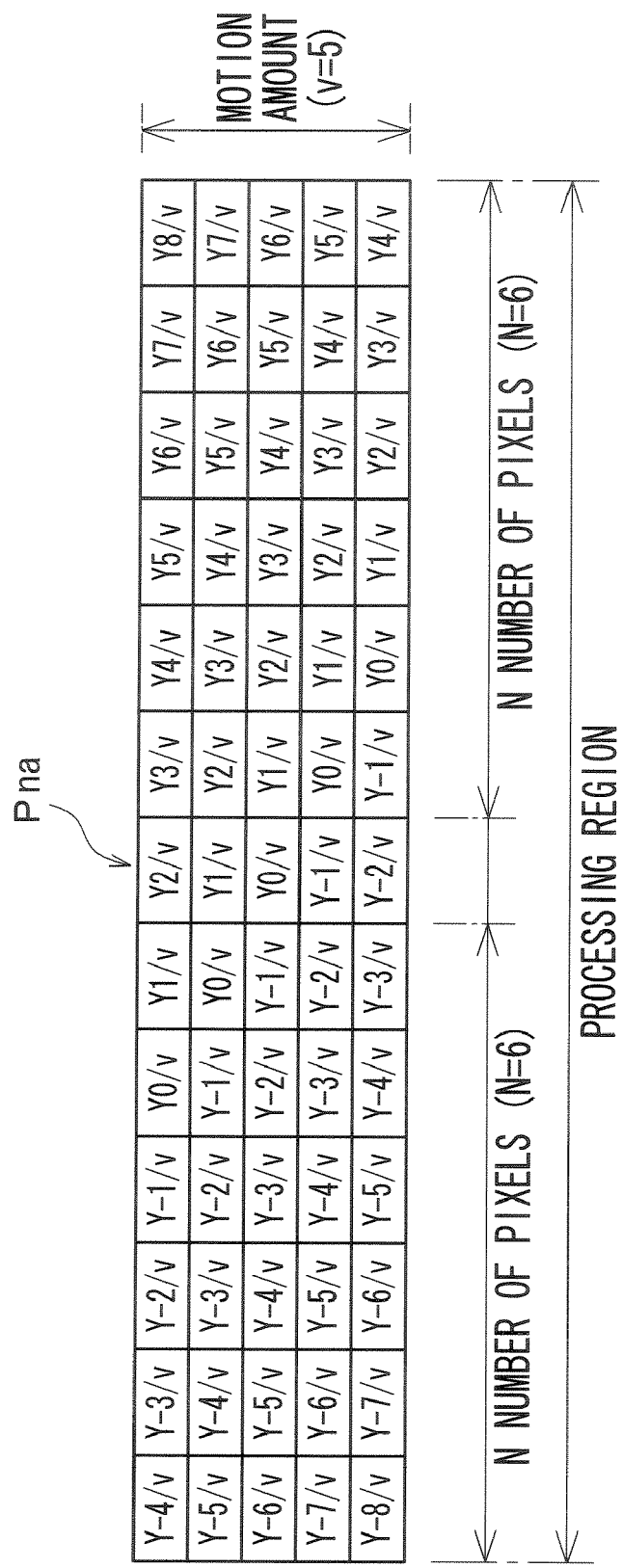
FIG. 8 is a chart for explaining time-wise mixture of real world variables in the processing region (in a case where a motion amount v=5)

Herein, in the processing region, as shown in FIG. 8, real world variables ($Y_{-8}, \ldots, Y_0, \ldots, Y_8$) are mixed time-wise. It is to be noted that FIG. 8 shows a case where a motion amount v is set to "v=5" and the processing region is made up of 13 pixels (N=6, where N is the number of pixels in a width of processing for the target pixel).

In blur-removing processing, a real world is estimated on the processing region, pixel value DQ0 corresponding to a central pixel variable $Y_0$ of the estimated real world is set as a pixel value of a target pixel whose motion blurs have been removed.

If the pixel values of the pixels constituting the processing region are represented by $X_{-N}, X_{-N+1}, \ldots, X_0, \ldots, X_{N-1}, X_N$, (2N+1) number of mixture equations such as ones indicated in Equation 5 are established. It is to be noted that pixel values Xt indicate pixel values of pixel positions Pt. Constant h indicates a value of an integral portion motion amount v multiplied by ½, that is, a value obtained by discarding its decimal places.

$$\sum_{i=t-h}^{t+h} (Yi/v) = Xt \quad (5)$$

(where $t = -N, \ldots, 0, \ldots, N$)

However, there are (2N+v) number of real world variables ($Y_{-N-h}, \ldots, Y_0, \ldots, Y_{N+h}$). In other words, the equations are outnumbered by the variables, so that it is impossible to obtain the real world variables ($Y_{-N-h}, \ldots, Y_0, \ldots, Y_{N+h}$) based on the Equation 5.

Therefore, by using Equation 6, which is a constraint equation employing a space correlation of inter-adjacent pixel difference=0, the number of the equations is increased than the real world variables, to obtain values of the real world variables by the least-squares method.

$$Yt - Yt+1 = 0 \text{ (where } t = -N-h, \ldots, 0, \ldots, N+h-1) \quad (6)$$

In other words, by using (4N+v) number of equations including the (2N+1) number of mixture equations represented by the Equation 5 and the (2N+v-1) number of constraint equations represented by the Equation 6, the (2N+v) number of real world variables ($Y_{-N-h}, \ldots, Y_0, \ldots, Y_{N+h}$), which are unknown variables, are obtained.

Herein, by performing such estimation as to minimize a sum of squares of errors that occur in the equations, it is possible to suppress fluctuations in the pixel values in the real world with performing processing to generate an image from which motion blur is removed.

Equation 7 indicates a case where the processing region is set as shown in FIG. 8, in which errors that occur in the respective Equations 5 and 6 are added to them.

$$\begin{bmatrix} 1/v & 1/v & 1/v & 1/v & 1/v & 0 & 0 & 0 & 0 & 0 & 0 & 0 & 0 & 0 & 0 & 0 \\ 0 & 1/v & 1/v & 1/v & 1/v & 1/v & 0 & 0 & 0 & 0 & 0 & 0 & 0 & 0 & 0 & 0 \\ 0 & 0 & 1/v & 1/v & 1/v & 1/v & 1/v & 0 & 0 & 0 & 0 & 0 & 0 & 0 & 0 & 0 \\ 0 & 0 & 0 & 1/v & 1/v & 1/v & 1/v & 1/v & 0 & 0 & 0 & 0 & 0 & 0 & 0 & 0 \\ 0 & 0 & 0 & 0 & 1/v & 1/v & 1/v & 1/v & 1/v & 0 & 0 & 0 & 0 & 0 & 0 & 0 \\ 0 & 0 & 0 & 0 & 0 & 1/v & 1/v & 1/v & 1/v & 1/v & 0 & 0 & 0 & 0 & 0 & 0 \\ 0 & 0 & 0 & 0 & 0 & 0 & 1/v & 1/v & 1/v & 1/v & 1/v & 0 & 0 & 0 & 0 & 0 \\ 0 & 0 & 0 & 0 & 0 & 0 & 0 & 1/v & 1/v & 1/v & 1/v & 1/v & 0 & 0 & 0 & 0 \\ 0 & 0 & 0 & 0 & 0 & 0 & 0 & 0 & 1/v & 1/v & 1/v & 1/v & 1/v & 0 & 0 & 0 \\ 0 & 0 & 0 & 0 & 0 & 0 & 0 & 0 & 0 & 1/v & 1/v & 1/v & 1/v & 1/v & 0 & 0 \\ 0 & 0 & 0 & 0 & 0 & 0 & 0 & 0 & 0 & 0 & 1/v & 1/v & 1/v & 1/v & 1/v & 0 \\ 0 & 0 & 0 & 0 & 0 & 0 & 0 & 0 & 0 & 0 & 0 & 1/v & 1/v & 1/v & 1/v & 1/v \\ 1 & -1 & 0 & 0 & 0 & 0 & 0 & 0 & 0 & 0 & 0 & 0 & 0 & 0 & 0 & 0 \\ 0 & 1 & -1 & 0 & 0 & 0 & 0 & 0 & 0 & 0 & 0 & 0 & 0 & 0 & 0 & 0 \\ 0 & 0 & 1 & -1 & 0 & 0 & 0 & 0 & 0 & 0 & 0 & 0 & 0 & 0 & 0 & 0 \\ 0 & 0 & 0 & 1 & -1 & 0 & 0 & 0 & 0 & 0 & 0 & 0 & 0 & 0 & 0 & 0 \\ 0 & 0 & 0 & 0 & 1 & -1 & 0 & 0 & 0 & 0 & 0 & 0 & 0 & 0 & 0 & 0 \\ 0 & 0 & 0 & 0 & 0 & 1 & -1 & 0 & 0 & 0 & 0 & 0 & 0 & 0 & 0 & 0 \\ 0 & 0 & 0 & 0 & 0 & 0 & 1 & -1 & 0 & 0 & 0 & 0 & 0 & 0 & 0 & 0 \\ 0 & 0 & 0 & 0 & 0 & 0 & 0 & 1 & -1 & 0 & 0 & 0 & 0 & 0 & 0 & 0 \\ 0 & 0 & 0 & 0 & 0 & 0 & 0 & 0 & 1 & -1 & 0 & 0 & 0 & 0 & 0 & 0 \\ 0 & 0 & 0 & 0 & 0 & 0 & 0 & 0 & 0 & 1 & -1 & 0 & 0 & 0 & 0 & 0 \\ 0 & 0 & 0 & 0 & 0 & 0 & 0 & 0 & 0 & 0 & 1 & -1 & 0 & 0 & 0 & 0 \\ 0 & 0 & 0 & 0 & 0 & 0 & 0 & 0 & 0 & 0 & 0 & 1 & -1 & 0 & 0 & 0 \\ 0 & 0 & 0 & 0 & 0 & 0 & 0 & 0 & 0 & 0 & 0 & 0 & 1 & -1 & 0 & 0 \\ 0 & 0 & 0 & 0 & 0 & 0 & 0 & 0 & 0 & 0 & 0 & 0 & 0 & 1 & -1 & 0 \\ 0 & 0 & 0 & 0 & 0 & 0 & 0 & 0 & 0 & 0 & 0 & 0 & 0 & 0 & 1 & -1 \end{bmatrix} \begin{bmatrix} Y_{-8} \\ Y_{-7} \\ Y_{-6} \\ Y_{-5} \\ Y_{-4} \\ Y_{-3} \\ Y_{-2} \\ Y_{-1} \\ Y_0 \\ Y_1 \\ Y_2 \\ Y_3 \\ Y_4 \\ Y_5 \\ Y_6 \\ Y_7 \\ Y_8 \end{bmatrix} = \quad (7)$$

$$\begin{bmatrix} X_{-6} \\ X_{-5} \\ X_{-4} \\ X_{-3} \\ X_{-2} \\ X_{-1} \\ X_0 \\ X_1 \\ X_2 \\ X_3 \\ X_4 \\ X_5 \\ X_6 \\ \hline 0 \\ 0 \\ 0 \\ 0 \\ 0 \\ 0 \\ 0 \\ 0 \\ 0 \\ 0 \\ 0 \\ 0 \\ 0 \\ 0 \\ 0 \\ 0 \end{bmatrix} + \begin{bmatrix} e_{m-6} \\ e_{m-5} \\ e_{m-4} \\ e_{m-3} \\ e_{m-2} \\ e_{m-1} \\ e_{m0} \\ e_{m1} \\ e_{m2} \\ e_{m3} \\ e_{m4} \\ e_{m5} \\ e_{m6} \\ \hline e_{b_0} \\ e_{b_1} \\ e_{b_2} \\ e_{b_3} \\ e_{b_4} \\ e_{b_5} \\ e_{b_6} \\ e_{b_7} \\ e_{b_8} \\ e_{b_9} \\ e_{b_{10}} \\ e_{b_{11}} \\ e_{b_{12}} \\ e_{b_{13}} \\ e_{b_{14}} \\ e_{b_{15}} \end{bmatrix}$$

This Equation 7 can be expressed as Equation 8 and such Y (=$Y_i$) as to minimize a sum of squares E of errors indicated in Equation 9 is obtained as Equation 10. It is to be noted that T in the Equation 10 stands for a transposed matrix.

$$AY = X + e \quad (8)$$

$$E = |e|^2 = \Sigma emi^2 + \Sigma ebi^2 \quad (9)$$

$$Y = (A^T A)^{-1} A^T X \quad (10)$$

Herein, a sum of squares of errors is indicated by Equation 11, so that by partially differentiating the sum of squares of the errors in order to provide a partial differential value of 0 as indicated by Equation 12, the Equation 10 that minimizes the sum of squares of the errors can be obtained.

$$E = (AY - X)^T (AY - X) \quad (11)$$
$$= Y^T A^T A Y - 2 Y^T A^T X + X^T X$$

$$\partial E / \partial Y = 2(A^T A Y - A^T X) = 0 \quad (12)$$

By performing linear combination on this Equation 10, the real world variables ($Y_{-N-h}, \ldots, Y_0, \ldots, Y_{N+h}$) can be respectively obtained so that a pixel value of the central pixel variable $Y_0$ can be set as a pixel value of the target pixel.

Although the above example has obtained the real world variables ($Y_{-N-h}, \ldots, Y_0, \ldots, Y_{N+h}$) by the least-squares method so that a sum of squares E of errors in AY=X+e may be minimized, it is also possible to make the equations in such a manner that the number of the equations may be equal to the number of the variables. By assuming this equation to be AY=X and modifying it into Y=$A^{-1}$X, the real world variables ($Y_{-N-h}, \ldots, Y_0, \ldots, Y_{N+h}$) can be obtained.

Herein, if obtaining the pixel value F29 with setting the pixel position P47 shown in FIG. 5A as a target pixel, a processing coefficient to be used at each of the pixels indicates a shape shown in FIG. 5B. In other words, an absolute value of the processing coefficient for the pixel of each pixel position used for calculation of difference thereof increases more than that of processing coefficient for other pixel. Such the pixel of each pixel position used for calculation of difference provides the main term.

Figure 9A:
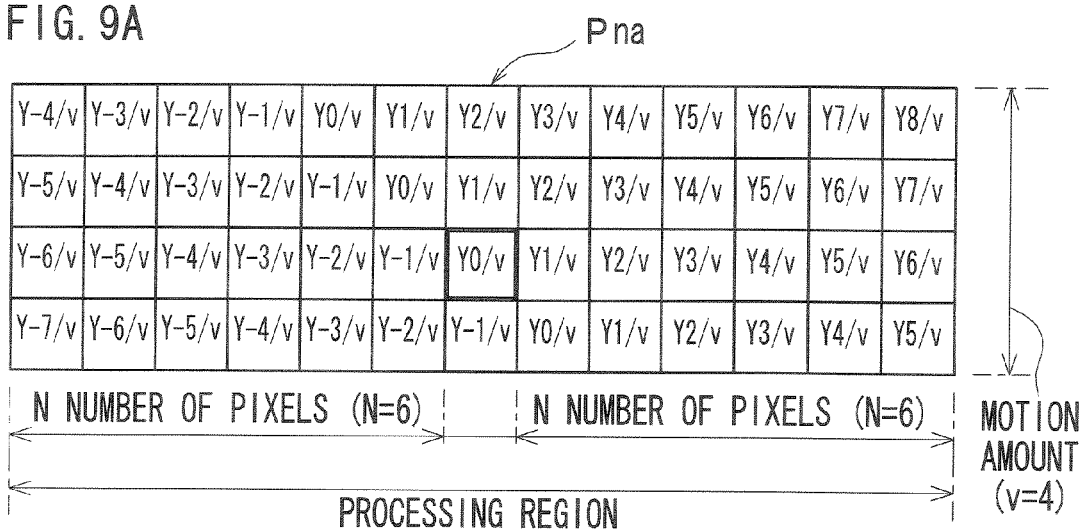
FIGS. 9A and 9B are charts each for explaining time-wise mixture of real world variables in the processing region (in a case where a motion amount v=4)
Figure 9B:
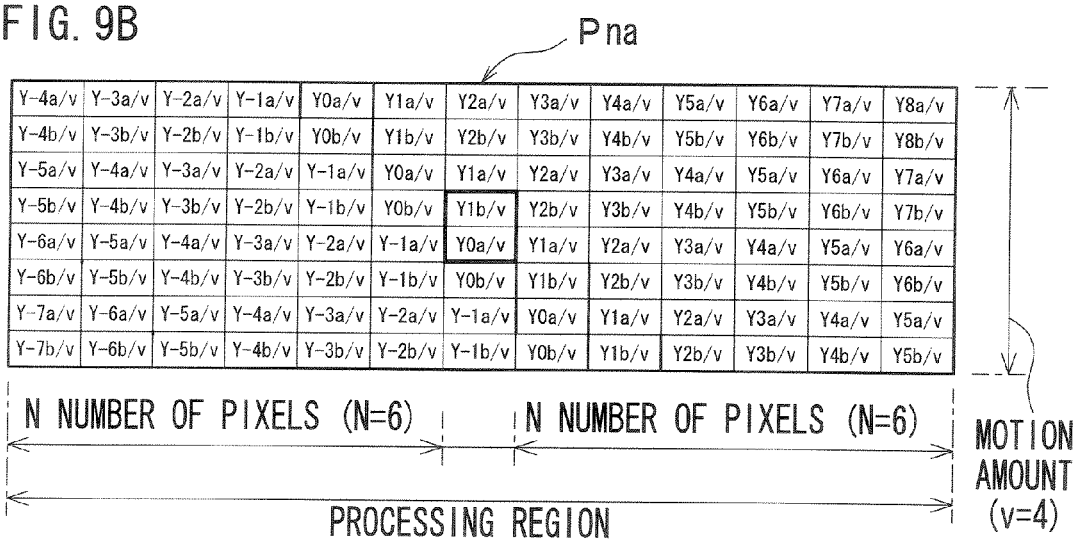

If the motion amount v is as much as an odd number of pixels, the central pixel variable $Y_0$ has its phase centered time-wise as shown in FIG. 8. However, if the motion amount v is as much as an even number of pixels, the central pixel variable $Y_0$ has its phase not centered time-wise as shown in FIG. 9A, thus encountering a difference in phase. Therefore, the virtual divisor is increased by two, to divide one frame period into eight with equal time intervals as shown in FIG. 9B. Moreover, by adding up $Y_{0a}$ and $Y_{1b}$, it is possible to obtain a value whose phase is centered time-wise as in the case of the central pixel variable $Y_0$ where the motion amount v is as much as an odd number of pixels.

Figure 10:
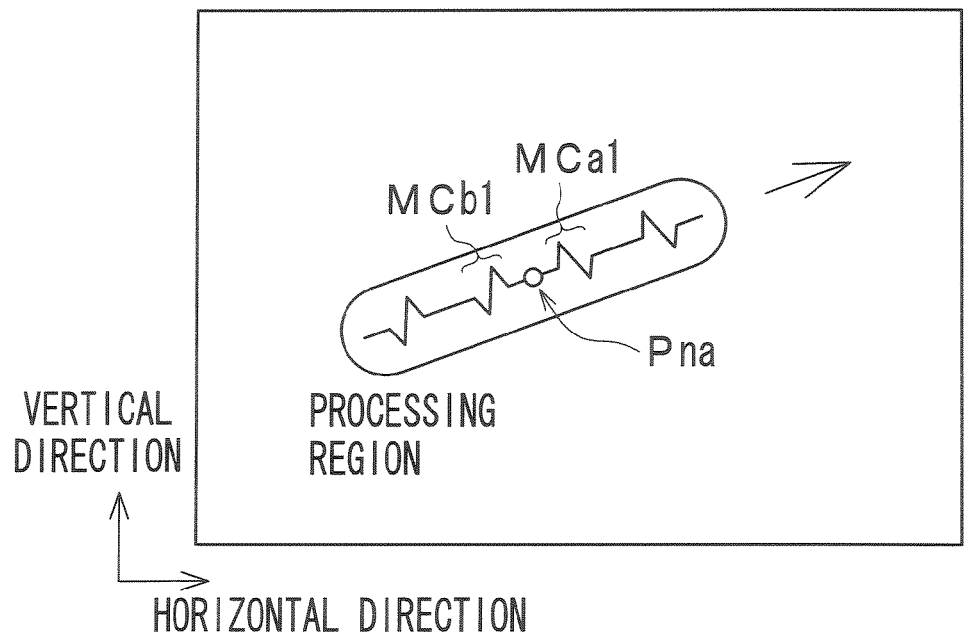
FIG. 10 is a diagram for illustrating positions of main terms in a space direction.

Space directional locations of the main terms become pixel positions that correspond to a motion amount in a motion direction with reference to the target pixel Pna, as shown in FIG. 10. It is to be noted that a main term MCa1 is closest to the target pixel Pna in the moving direction and a main term MCb1 is closest to it in a direction opposite to the motion direction.

Further, with taking a space phase into consideration, main terms in a case where the motion amount is as much as an odd number of pixels have their coefficients greatly fluctuating in units of two consecutive pixels, as shown in FIGS. 5A and 5B. Accordingly, if obtaining a target pixel Pna by using the main terms, the phase of the target pixel Pna is located at the center of the two pixels. In other words, a motion-blur-removed image has its phase shifted by a half of pixel with respect to an image relative to each of the (t−1) and (t) frames.

Figure 11:
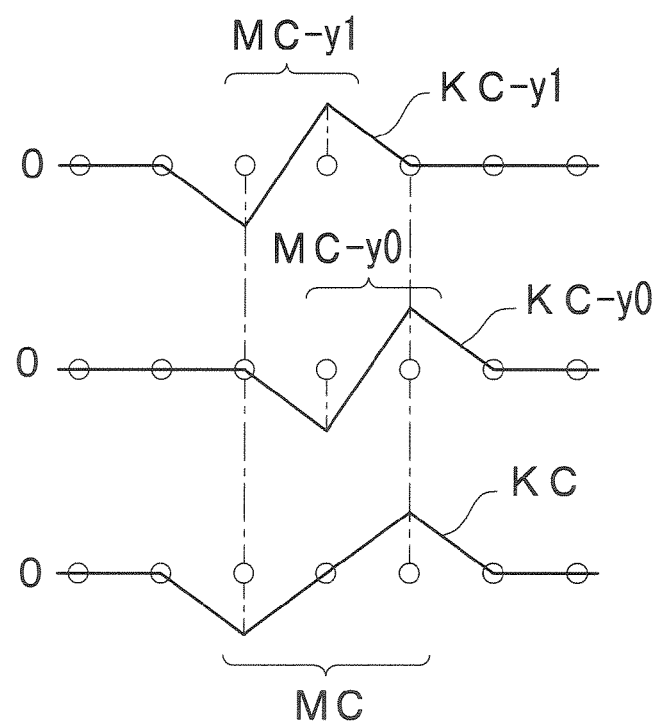
FIG. 11 is a diagram for showing processing coefficients in the case of matching space-directional phases with each other.

Further, to prevent occurrence of a half-pixel shift in phase, processing coefficient KC−y0 corresponding to the central pixel variable $Y_0$ and processing coefficient KC−y1 corresponding to a variable $Y_1$ (alternatively, $Y_{-1}$), as shown in FIG. 11, can be added up to subsequently use a halved processing coefficient KC. It is to be noted that in FIG. 11, circles indicate pixel positions. If such a processing coefficient KC is generated, main terms are provided in units of three pixels, so that by using the processing coefficients KC, phase of the target pixel Pna is the same as those of pixels of the (t−1) frame image and (t) frame image, thereby enabling to be obtained an image from which the motion blur has been removed and which has the same phase as those of the (t−1) frame image and (t) frame image. When the motion amount v is as much as an even number of pixels as shown in FIG. 9B, since the virtual divisor is increased by two, the variable $Y_{0a}$ is half the variable $Y_0$ and the variable $Y_{1b}$ is half the variable $Y_1$, so that a sum of the variables $Y_{0a}$ and $Y_{1b}$ is equal to half a sum of the processing coefficient KC−y0 corresponding to the central pixel variable $Y_0$ and the processing coefficient KC−y1 corresponding to the variable $Y_1$, thereby providing, in units of three pixels, main terms in a case where the motion amount v is as much as an even number of pixels.

Figure 12:
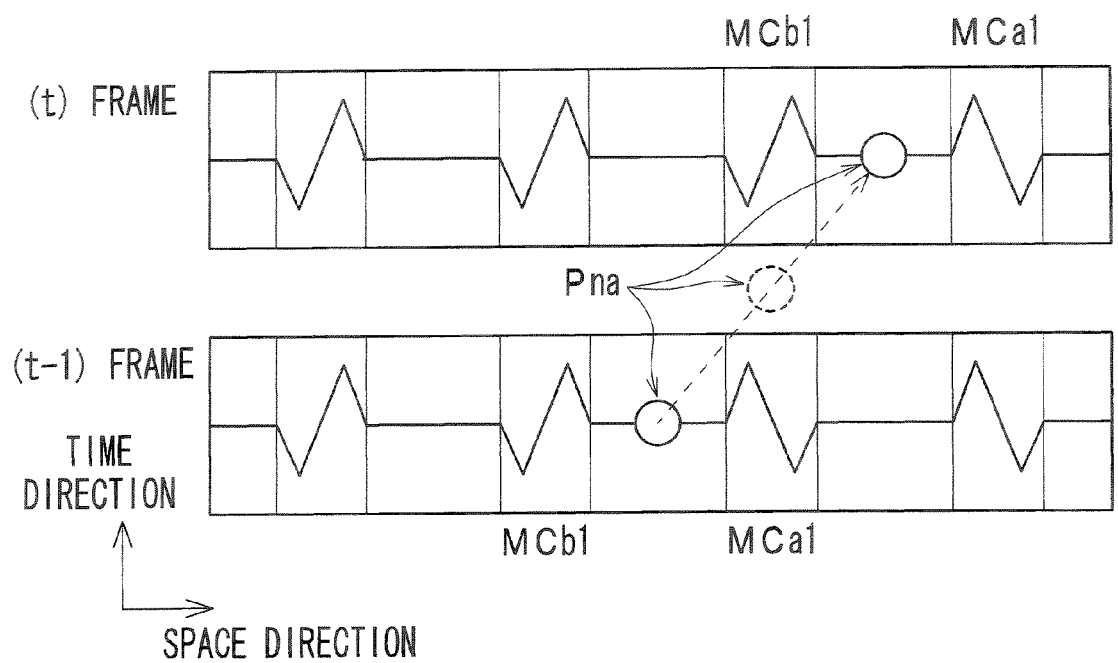
FIG. 12 is a diagram for illustrating positions of main terms in a time direction.

Time directional positions of the main terms appear at the same pixel position on plural images as shown in FIG. 12. Further, with paying attention to the above-mentioned main terms MCa1 and MCb1, the position of the main term MCa1 on an image of the (t−1) frame agrees with that of the main term MCb1 on an image of the (t) frame. Therefore, a pixel position which has a phase at the center of the (t−1) and (t) frames and at which both of the main terms Mca1 and MCb1 are almost located corresponds to the target pixel Pna. In other words, the main term MCa1 stays in the image of pixel values $X_{-3}$, $X_{-2}$, and the main term KMCb1 stays in the image of values $X_2$, and $X_3$ in a case of the motion amount v=5, the special position of the target pixel Pna corresponds to a middle position between those of the pixels of the pixel values $X_{-3}$, $X_{-2}$, or a middle position between those of the pixels of the pixel values $X_3$, $X_2$. Further, if the main terms are converted in units of three pixels when the motion amount v is as much as an even number of pixels or an odd number of pixels, it can be located at the almost same pixel position as those of pixels of the (t−1) and (t) frames.

Figure 13A:
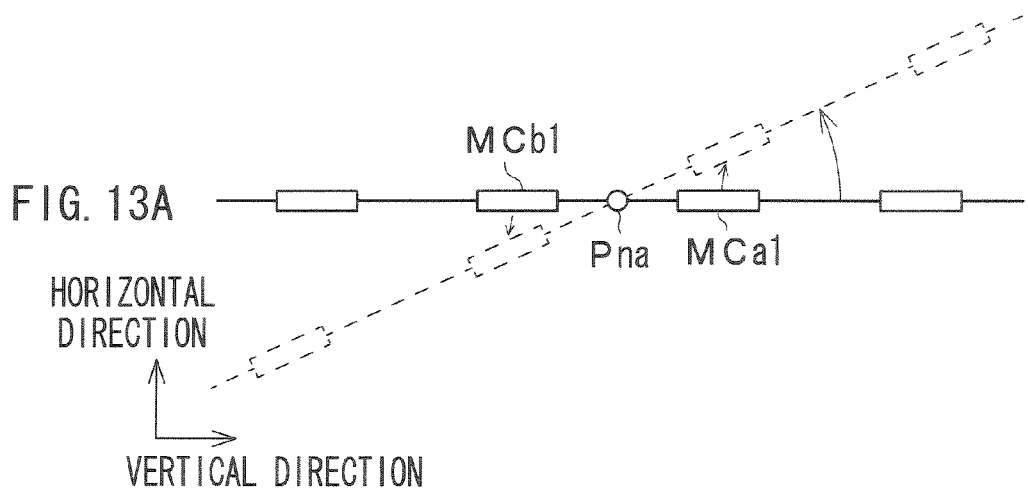
FIGS. 13A and 13B are diagrams each for explaining a relationship between shift of the motion vector and shift in positions of the main terms in a case where the main terms are used in the space direction.

Herein, as shown in FIG. 13A, if by using only main terms in a space direction, a pixel position that is located at a middle position between the main terminals MCa1 and MCb1, which are present in the space direction, is set as output position of the motion-blur-removed target pixel Pna, positions of the main terminals Mca1 and MCb1 and the like are fluctuated on a large scale, as shown in broken lines, when motion vector of the target pixel Pna cannot be accurately detected, so that it is impossible to remove the motion blur of the target pixel Pna accurately.

Figure 13B:
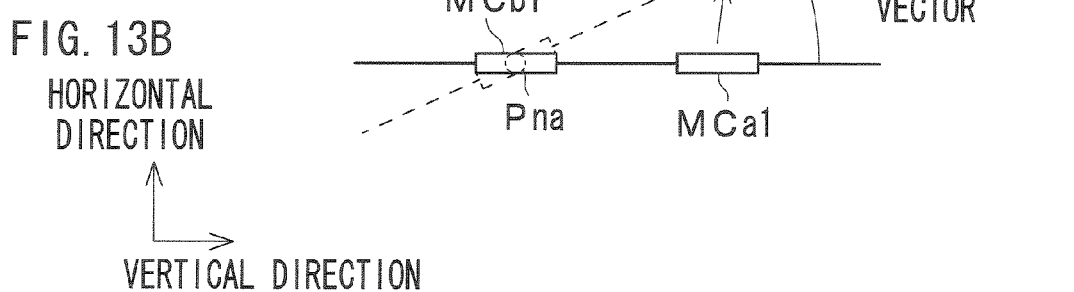

As shown in FIG. 13B, also, if by using only main terms in a space direction, a pixel position that is located at a middle position between the frames is set as an output phase of the motion-blur-removed target pixel Pna, position of the main terminal MCb1 has a slight influence on detection accuracy of the motion vector but positions of the remaining main term MCa1 and the like have a great influence on the detection accuracy of the motion vector, as shown in broken lines, so that it is impossible to remove the motion blur of the target pixel Pna accurately.

Further, if by using main terms in a time direction, a pixel position that is located at a middle position between the main terminals MCa1 and MCb1 is set as output position of the motion-blur-removed target pixel Pna as the case of FIG. 13A, positions of the main terminals are fluctuated in the time direction when motion vector of the target pixel Pna cannot be accurately detected, so that it is impossible to remove the motion blur accurately.

Figure 14:
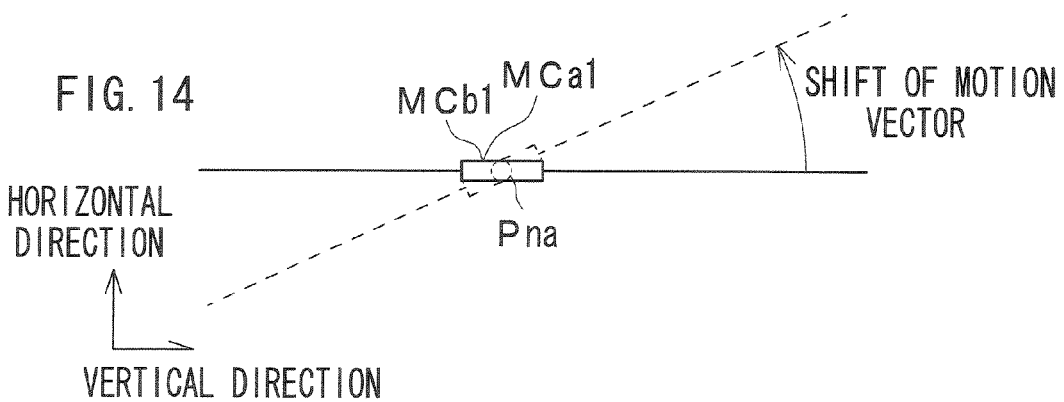
FIG. 14 is a diagram for explaining a relationship between shift of the motion vector and shift in positions of the main terms in a case where the main terms are used in the time direction.

Thus, as shown FIG. 14, by using main terms in a time direction, the middle between the frames is set as an output phase of the motion-blur-removed target pixel Pna to generate a motion-blur-removed pixel value of the target pixel Pna. In other words, by using the main term MCa1 on the image of (t−1) frame and the main term MCb1 on the image of (t) frame as shown in FIG. 12, a pixel that is located at a middle phase between the (t−1) frame and the (t) frame and has the almost same space position as those of the main terms MCa1 and MCb1 is set as the target pixel Pna of the target image to generate a motion-blur-removed pixel value thereof. Thus, if an output phase of the motion-blur-removed target pixel Pna is set as the middle between the frames of (t−1) and (t) frames, positions of main terms in the time direction have a slight influence on detection accuracy of the motion vector, so that positions of main terms can be not fluctuated on a large scale even if the motion vector cannot be accurately detected, thereby enabling the motion blur to be satisfactorily removed without having any influence on detection accuracy of the motion vector.

Shapes of the processing coefficients of the main terms of the (t−1) frame and (t) frame indicate those of the coefficients, which have replaced their positive and negative to each other in the time direction with respect to the position of the target pixel Pna, as clearly shown in FIG. 12. Accordingly, in a case of a still background that has the almost same pixel value between the pixel values in advance and afterward and has a strong space correlation with each other, large processing coefficients in advance and afterward are eliminated from each other, so that as a result thereof, this is identical to a case where small processing coefficients are allocated. Therefore, it is possible to hard for any failure in the image to occur even if motion blur removing used for an object having a large motion amount is performed on a still background.

Figure 15:
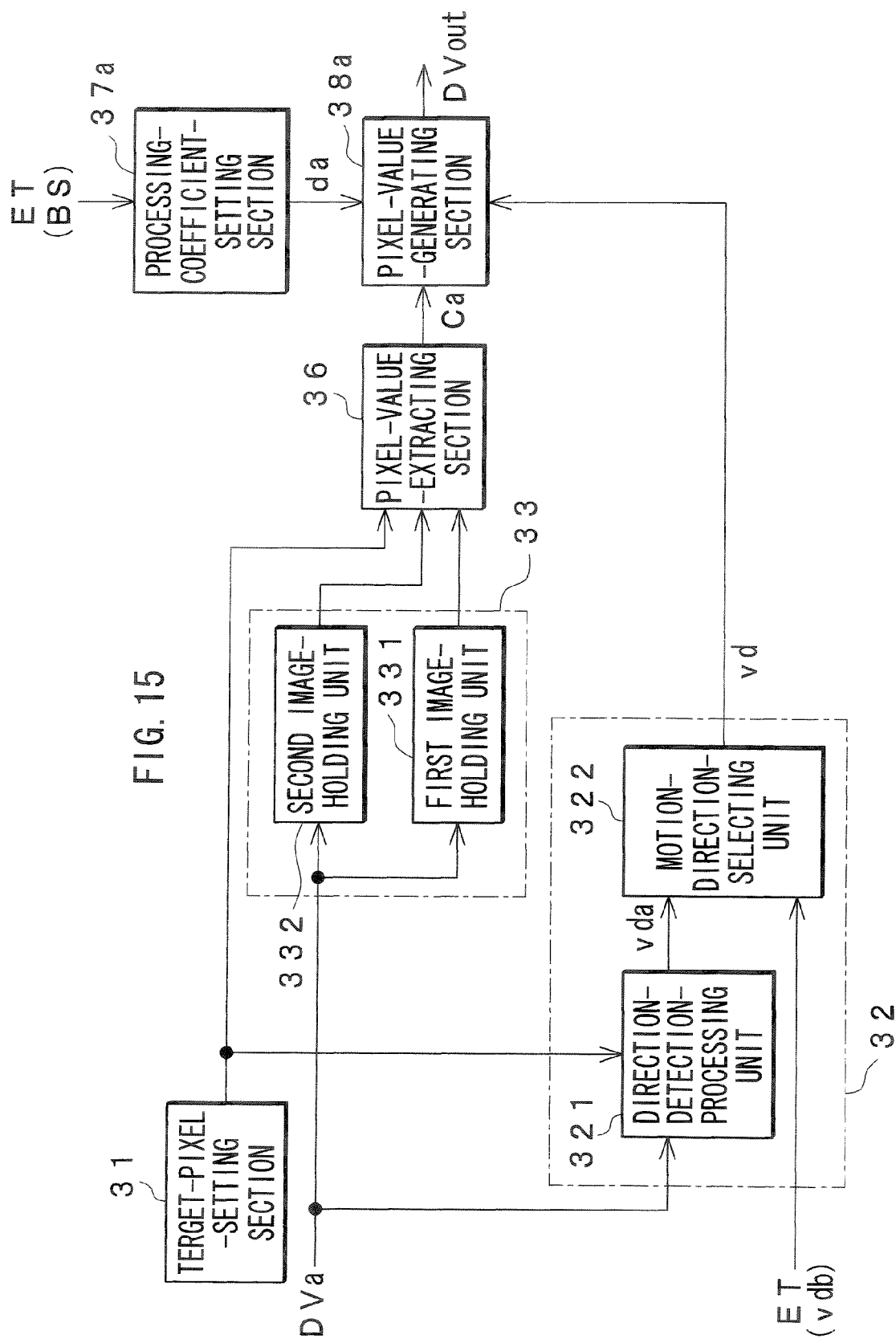
FIG. 15 is functional block diagram of an image-processing apparatus.

FIG. 15 shows a functional diagram of the image-processing apparatus that uses the main terms in time and space directions and performs motion blur removing by setting the middle between the frames as an output phase of the motion-blur-removed target pixel Pna. It is to be noted that functions of the image-processing apparatus may be realized by hardware or software, whichever available. In other words, the function blocks of FIG. 15 may be realized by either hardware or software.

Figure 16:
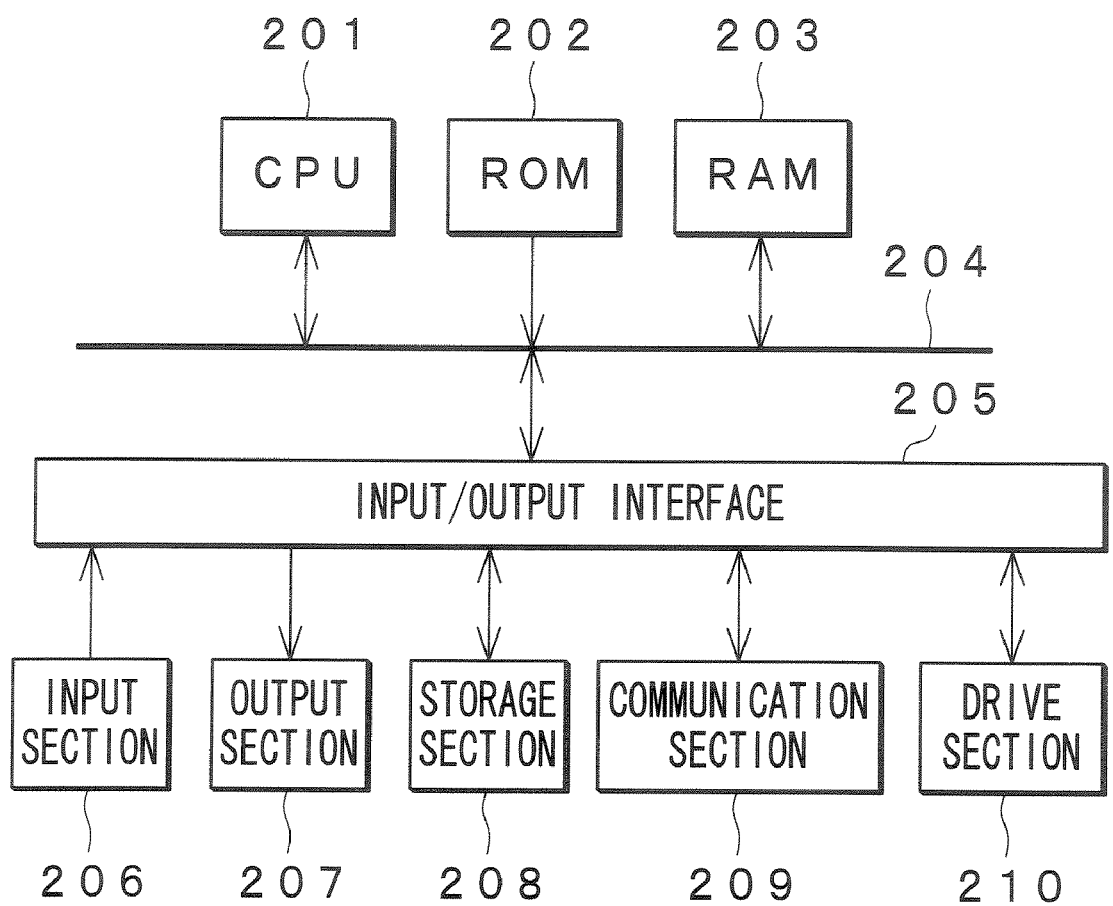
FIG. 16 is a diagram for showing a configuration of the image-processing apparatus in a case where software is used.

A configuration of the image-processing apparatus 20 in use of the software is shown in, for example, FIG. 16. A central processing unit (CPU) 201 performs various kinds of processing in accordance with programs stored in a read only memory (ROM) 202 or a storage section 208, and the programs to realize the functions of the image-processing apparatus are stored in the ROM 202 and/or the storage section 208. A random access memory (RAM) 203 appropriately stores a program or data which is executed by the CPU 201. The CPU 201, the ROM 202, and the RAM 203 are connected to each other via a bus 204.

To the CPU 201, an input/output interface 205 is connected via the bus 204. An input section 206 constituted of a keyboard, a mouse, or a microphone and an output section 207 constituted of a display or a speaker are connected to the input/output interface 205. The CPU 201 performs various kinds of processing in accordance with commands input from the input section 206. Then, the CPU 201 provides the output section 207 with an image, an audio, etc. obtained as a result of the processing.

The storage section 208 connected to the input/output interface 205 is constituted of, for example, a hard disk, to store programs and various kinds of data to be run by the CPU 201. A communication section 209 communicates with an external apparatus via the Internet or any other network. In this example, the communication section 209 serves as an acquisition section that takes in an output of the sensor. It may also acquire programs via the communication section 209 and store them in the storage section 208.

A drive section 210 connected to the input/output interface 205, if mounted with a storage medium such as a magnetic disk, an optical disk, a magnetic optical disk, or a semiconductor memory, drives them to acquire program or data stored in the storage medium. The acquired programs and data are transferred to the storage section 208 and stored in it as necessary.

As shown in FIG. 15, an image signal DVa that has been supplied to the image-processing apparatus 20 is supplied to a direction-detection-processing unit 321 of a motion-direction-detecting section 32, and a first image-holding unit 331 and a second image-holding unit 332 of a peripheral-image-holding section 33, respectively.

A target-pixel-setting section 31 sets a target pixel Pna in a target image to be predicted. Herein, as described using the above-mentioned FIGS. 12, 14 and the like, by using the main term MCa1 on the image of (t−1) frame and the main term MCb1 on the image of (t) frame, it is possible to obtain the motion-blur-removed pixel value of the target pixel Pna, which is a pixel that has at a middle phase between the (t−1) frame and the (t) frame and is located at the almost same pixel position as those of the main terms MCa1 and MCb1. Thus, when the image signal DVa is a signal having a progressive format, the target-pixel-setting section 31 sets the target pixel Pna in this target image with the target image to be predicted being set as an image having a phase at the middle of the (t−1) frame and (t) frame. Further, images of the (t−1) frame and (t) frame are set as peripheral images. When the image signal DVa is a signal having an interlace format, the target-pixel-setting section 31 sets the target pixel Pna in this target image with the target image to be predicted being set as an image having a phase at the middle of the (t−1) field and (t) field. Further, images of the (t−1) field and (t) field are set as peripheral images.

The direction-detection-processing unit 321 detects a motion vector for each pixel based on the image signal DVa and supplies a motion-direction-selecting unit 322 with motion direction information vda indicative of a motion direction of target pixel set by the target-pixel-setting section 31. This direction-detection-processing unit 321 can use a method such as a block matching method or a gradient method to detect a motion vector for each pixel.

Into the motion-direction-selecting unit 322, motion direction information vdb indicative of the motion direction can be input as information ET from outside, and the motion-direction-selecting unit 322 selects any one from the motion direction information vda supplied from the direction-detection-processing unit 321 and the motion direction information vdb input from the outside to supply a pixel-value-generating section 38a with the selected motion direction information vd.

The first image-holding unit 331 and the second image-holding unit 332 of the peripheral-image-holding section 33 are constituted of memories and the first image-holding unit 331 holds an image of (t−1) frame that is a peripheral image. The second image-holding unit 332 also holds an image of (t) frame that is also a peripheral image.

A pixel-value-extracting section 36 extracts, in order to extract a main term that mainly contains components of a target pixel, at least pixels whose space positions roughly agree with that of the target pixel Pna, from the peripheral images which are held in the first image-holding unit 331 and the second image-holding unit 332, and supplies them to a pixel-value-generating section 38a.

The processing-coefficient-setting section 37a stores beforehand processing coefficients used for motion blur removing and supplies the pixel-value-generating section 38a with any processing coefficients thus stored. When receiving adjustment information BS that can adjust the motion blur as information ET from outside, the processing-coefficient-setting section 37a also switches the processing coefficients to be supplied to the pixel-value-generating section 38a based on this adjustment information BS to adjust motion-blur-removing effects. For example, even if a motion blur cannot optimally be performed by means of processing coefficients supplied first, it is possible to remove the motion blur optimally by switching the processing coefficients to other. Further, by switching the processing coefficients, a motion blur can be left intentionally.

If storing specific processing coefficients beforehand in the processing-coefficient-setting section 37a, the pixel-value-generating section 38a newly generates pixel values for processing from the pixel values extracted from the first image-holding unit 331 by the pixel-value-extracting section 36 and the motion direction information vd and performs multiply and accumulation calculation of the generated pixel values for processing and the specific processing coefficients, thereby generating a pixel value. Alternatively, it newly generates pixel values for processing from the pixel values extracted from the second image-holding unit 332 by the pixel-value-extracting section 36 and the motion direction information vd and performs multiply and accumulation calculation of the generated pixel values for processing and the specific processing coefficients, thereby generating a pixel value. By integrating two pixel values thus generated, the pixel value of the target pixel is generated and output as an image signal DVout.

Figure 17:
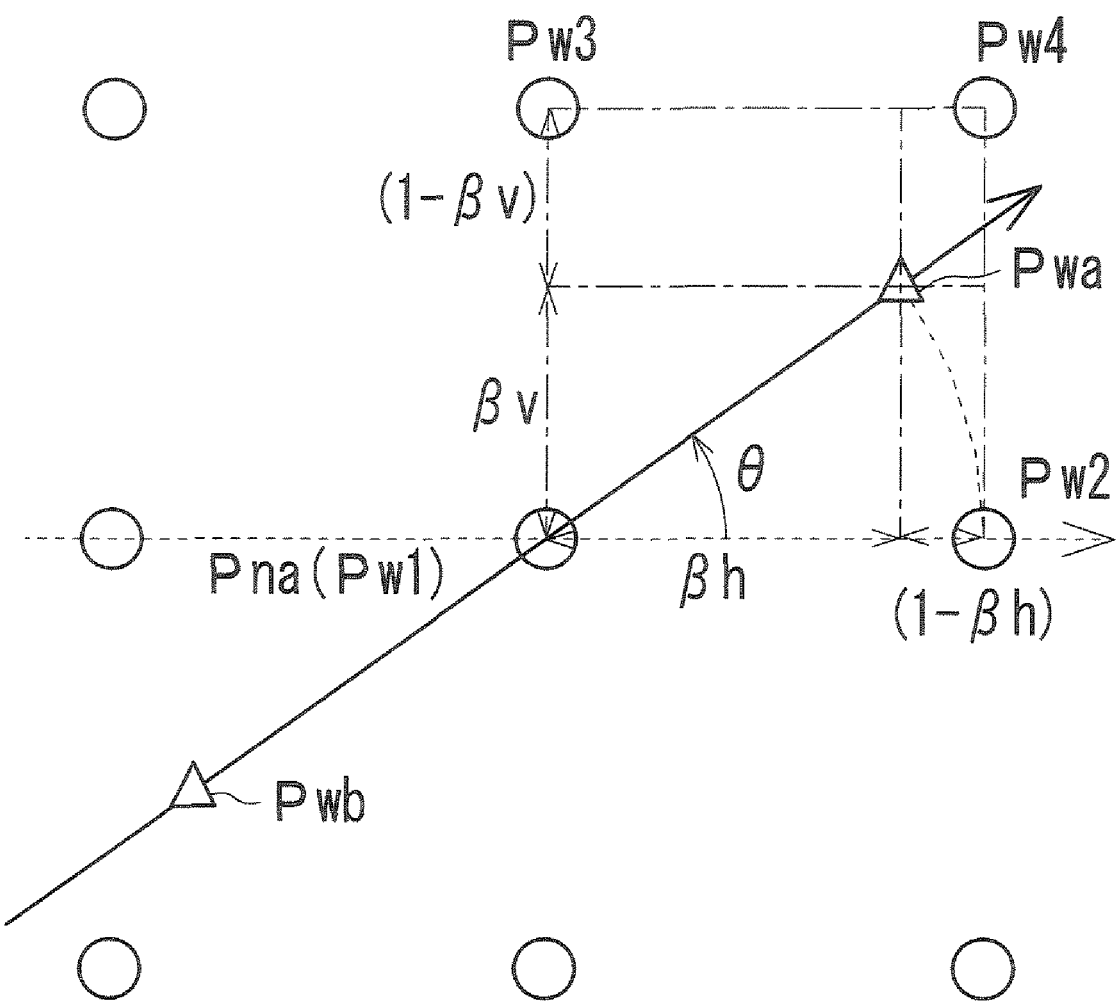
FIG. 17 is a diagram for explaining a method of calculating a pixel value.

Herein, the pixel values for processing will be generated as follows. In other words, when processing coefficients to be used in blur-removing processing are generated, a motion direction is set to a specific direction and processing coefficients thus obtained are stored as specific processing coefficients in the processing-coefficient-setting section 37a. In the pixel-value-generating section 38, if a motion direction indicated by the motion direction information vd has an angle difference of θ with respect to the specific direction at the time when the processing coefficients have been generated, namely, if, as shown in FIG. 17, for example, the motion direction set when the processing coefficients have been generated is horizontal and the motion direction indicated by the motion direction information vd has an angle difference of θ, pixel positions corresponding to the processing coefficients in the motion direction indicated by the motion direction information vd from a target pixel Pna are pixel positions Pwa and Pwb, which are indicated by triangles. Accordingly, a pixel value DPw of position Pwa is calculated by Equation 13 using pixel values of peripheral pixel positions Pw1, Pw2, Pw3, and Pw4. Further, similarly, a pixel value DPwb of position Pwb that is opposite to the position Pwa is calculated.

$$DPwa = (1 - \beta h) \times (1 - \beta v) \times DPw1 +$$ (13)

$$\beta h \times (1 - \beta v) \times DPw2 + (1 - \beta h) \times \beta v \times DPw3 + \beta h \times \beta v \times DPw4$$

where βh=cos θ, βv=sin θ, DPw1 is a pixel value of pixel position Pw1, and DPw2 to DPw4 are pixel values of pixel positions Pw2 to Pw4, respectively.

The pixel-value-generating section 38a uses pixel values thus calculated as the pixel values for processing and performs multiply and accumulation calculation of these pixel values for processing and the processing coefficients supplied from the processing-coefficient-setting section 37a to generate the pixel values, thereby integrating them to generate the image signal DVout.

Figure 18:
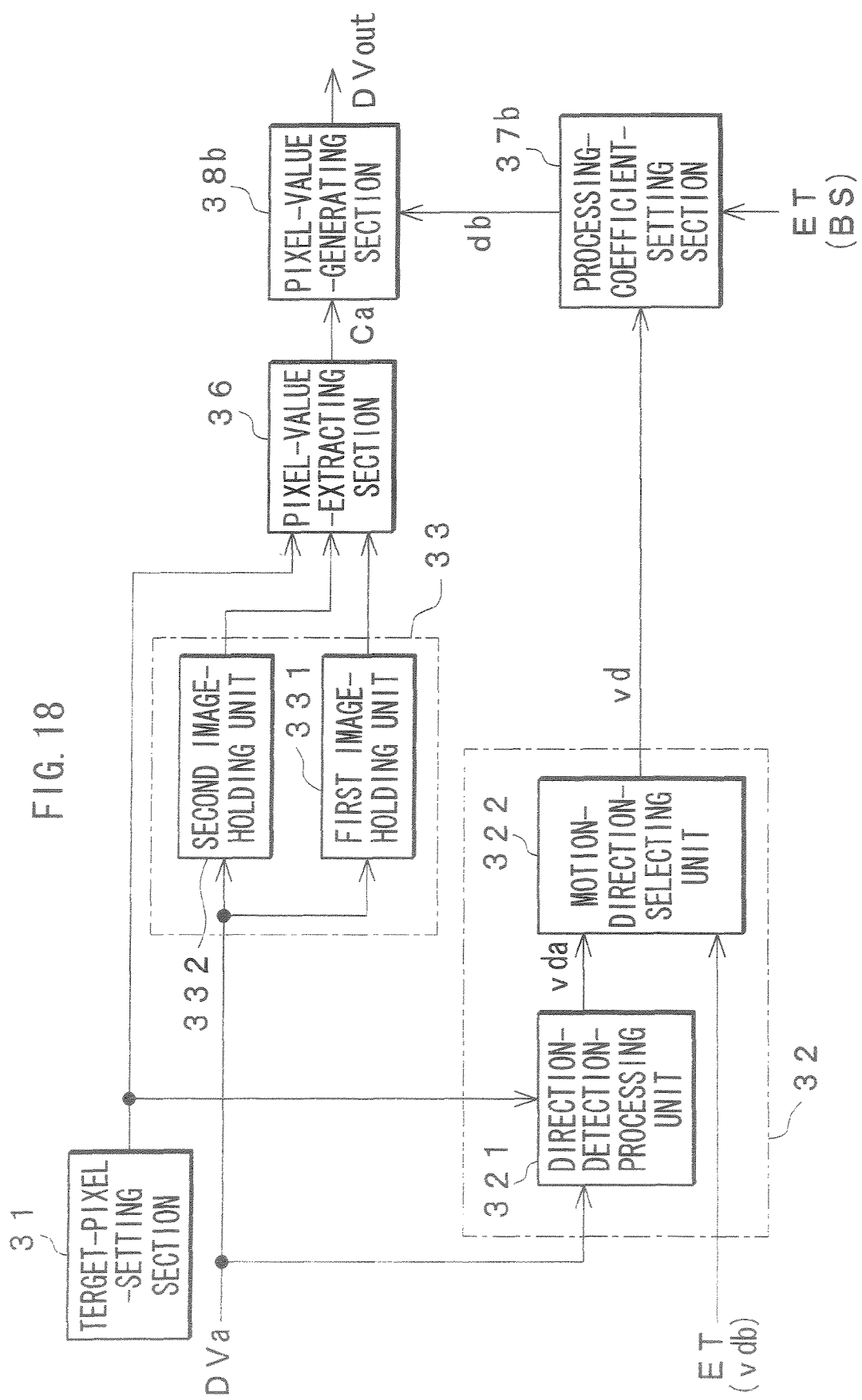
FIG. 18 is another functional block diagram of the image-processing apparatus.

By the way, the processing coefficients to be stored beforehand are not limited to the specific processing coefficients but processing coefficients may be stored for each motion direction. FIG. 18 shows a configuration of image-processing apparatus in which the processing coefficients corresponding to the motion directions are stored in the processing-coefficient-setting section. It is to be noted that components of FIG. 18 that correspond to those of FIG. 15 are indicated by the same symbols, detailed descriptions of which will be omitted.

The motion direction information vd that has been selected in the motion-direction-selecting unit 322 is supplied to a processing-coefficient-setting section 37b. Each of the coefficients, (1−α)×(1−β)), (α×(1−β)), ((1−α)×β) and (α×β) to be multiplied with the pixel values DPw1, DPw2, DPw3, and DPw4, respectively, in the equation 13 and specific processing coefficients da are multiplied with each other for each angle difference of θ and each result of the multiplications is stored into the processing-coefficient-setting section 37b as the processing coefficient db for each motion direction. This processing-coefficient-setting section 37b supplies a pixel-value-generating section 38b with the processing coefficients corresponding to the motion direction indicated by the motion direction information vd that is supplied from the motion-direction-selecting unit 322.

The pixel-value-generating section 38b performs multiple and accumulation calculation of pixel values of pixels extracted from the first image-holding unit 331 by the pixel-value-extracting section 36 and the processing coefficients db supplied from the processing-coefficient-setting section 37b, namely, it performs multiple and accumulation calculation of pixel values of the pixel values Pw1, Pw2, Pw3, and Pw4 and the processing coefficients corresponding to the motion direction, to generate a pixel value.

Alternatively, it performs multiple and accumulation calculation of pixel values of pixels extracted by the second image-holding unit 332 and the processing coefficients supplied from the processing-coefficient-setting section 37b, to generate a pixel value. By integrating these two pixel values, a pixel value of the target pixel is generated, thereby outputting it as the image signal DVout.

Figure 19:
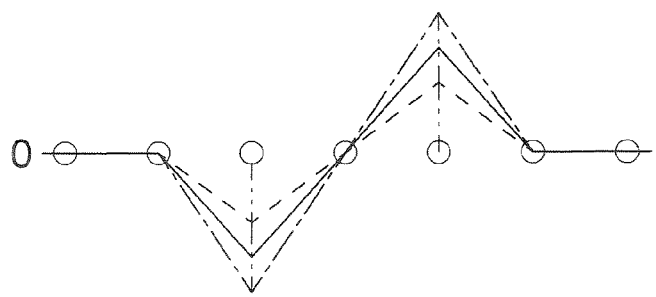
FIG. 19 is a diagram for showing a relationship between motion amounts and processing coefficients.

The processing coefficient has a small amount of value as shown in FIG. 19 by broken lines when the motion amount is small while it has a large amount of value as shown by alternate long and short dashed lines when the motion amount is large. For this reason, each of the processing-coefficient-setting sections 37a, 37b stores beforehand not only the specific processing coefficients or the processing coefficients for each motion direction but also the processing coefficients corresponding to motion amount, and the motion-direction-selecting unit 322 supplies each of the processing-coefficient-setting sections 37a, 37b with the motion direction information vd including not only the motion direction but also the motion amount. Further, each of the processing-coefficient-setting sections 37a, 37b can supply the pixel-value-generating sections 38a, 38b with the processing coefficients corresponding to the motion amount indicated by the motion direction information vd. It is to be noted that in FIG. 19, circles indicate pixel positions.

As described above, each of the pixel-value-generating sections 38a, 38b performs multiply and accumulation calculation of the extracted pixel values of pixels and the processing coefficients supplied from the processing-coefficient-setting sections 37a, 37b to generate pixel values and integrate them, thereby generating a pixel value of the target pixel and outputting it as the image signal DVout. Thus, by setting the processing coefficients by using the motion amount also, it is possible to remove the motion blur further accurately.

Further, if the motion amount v is as much as an even or odd number of pixels when the processing coefficients are set with the main term being set in units of three pixels, a phase of centered pixel in the units of three pixels agrees with that of the target pixel Pna. Therefore, a motion vector corresponding to the target pixel Pna can be obtained and then, the motion direction can be determined based on this motion vector. In this moment, for example, a motion vector is obtained from the (t−1) frame of pixels around the target pixel Pna and the (t) frame thereof and candidate vectors traversing the target pixel Pna are determined from this motion vector. These candidate vectors are averaged to provide a motion vector of the target pixel Pna. If the a motion vector of the target pixel Pna is thus obtained to determine the motion direction thereof, it is possible to generate an image from which any motion blur is properly removed even when a motion direction of a position corresponding to the target pixel Pna in (t−1) frame is different from a motion direction of a position corresponding to the target pixel Pna in (t) frame.

Figure 20:
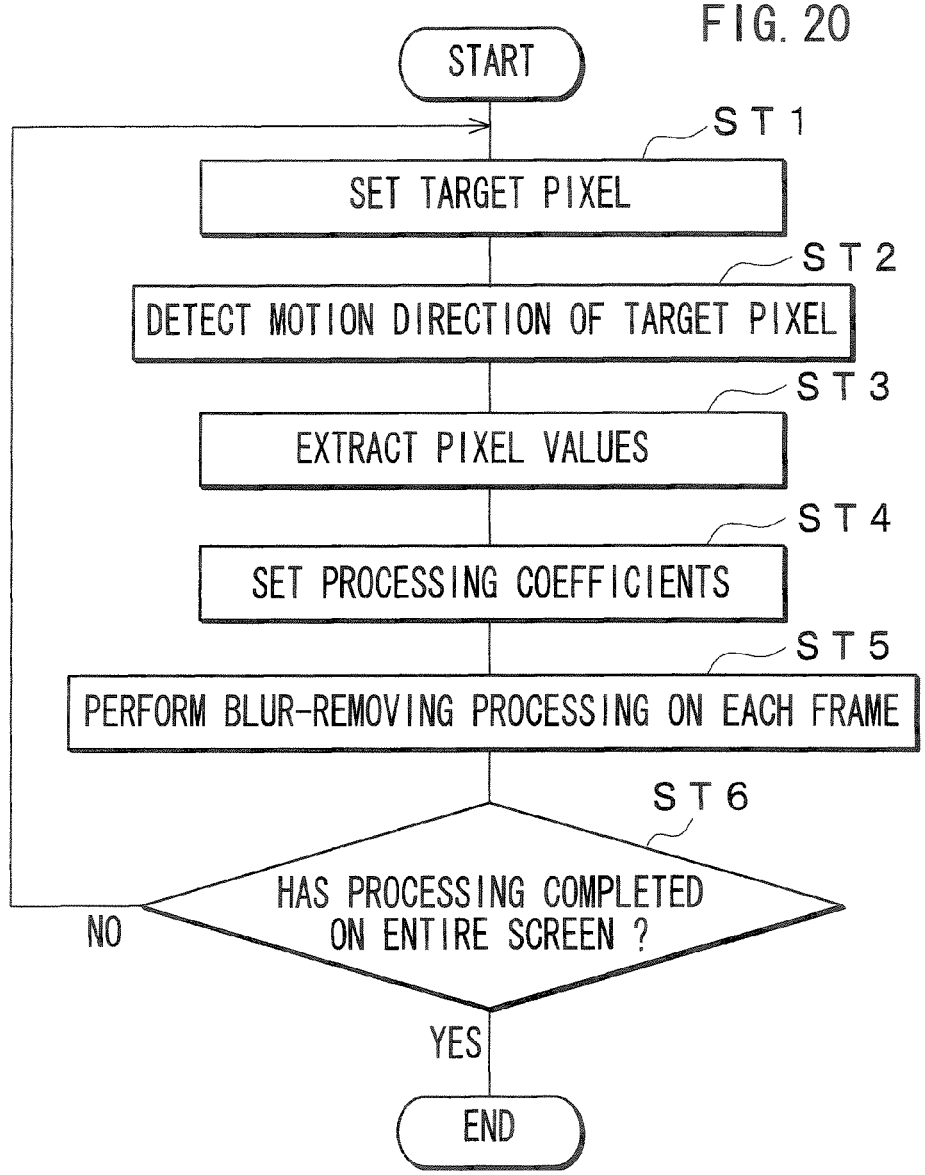
FIG. 20 is a flowchart for showing image processing.

FIG. 20 shows a flowchart in the case of performing image processing by using software. At step ST1, the CPU 201 sets a target pixel from which motion blur is to be removed, and proceeds to step ST2. At the step ST2, the CPU 201 detects the motion direction of the target pixel and proceeds to step ST3. At the step ST3, the CPU 201 performs extraction of the pixel values to extract at least pixel values of pixels in peripheral images whose space positions roughly agree with that of the target pixel. In other words, in order to extract a main term that mainly contains components of a target pixel in a moving object, the CPU 201 sets pixels in peripheral images whose space positions roughly agree with that of the target pixel as at least a prediction tap and extracts the pixel values in this prediction tap.

At step ST4, the CPU 201 sets the processing coefficients and proceeds to step ST5. In this processing-coefficient setting, the specific processing coefficients or the processing coefficients corresponding to the motion direction detected in the step ST2 are set. At the step ST5, the CPU 201 performs blur-removing processing on each of the frames. In other words, the CPU 201 generates a pixel value corresponding to the target pixel based on the pixel values in the prediction tap that has been extracted in the step ST3 and the motion-blur-removing-processing coefficients corresponding to the motion direction that has been set in the step ST4. Alternatively, it newly generates pixel values for processing from the extracted pixel values that correspond to the motion direction, calculates the pixel value corresponding to the target pixel based on the pixel values for processing and the specific motion-blur-removing-processing coefficient that has been set in the step ST4, and proceeds to step ST6.

At the step ST6, the CPU 201 decides whether blur-removing processing has completed on entire screen and, if any one of the pixels is not undergone yet the blur-removing processing, it returns to the step ST1 while if blur removing has completed on the entire screen, it ends the processing.

Processing coefficients to be stored in the processing-coefficient-setting section can be obtained using the above-mentioned model equations. In other words, by bringing a constraint of "inter-adjacent pixel difference=0" indicated into the Equation 6 and using accumulation characteristics indicated in the Equation 7, the matrix calculation is performed between pixels (corresponding to $Y_8$-$Y_{-8}$ indicated in the Equation 7) of a first region containing a target pixel in a still image corresponding to a real world variable and pixels (corresponding to $X_6$-$X_{-6}$ indicated in the Equation 7) of a second region containing pixels in an image that has encountered the same motion blur as that at a space position of the target pixel, to store, as the processing coefficients, coefficients which are used in calculation of the central pixel variable $Y_0$ that corresponds to the target pixel in the processing-coefficient-setting section 37a (37b). By thus using the coefficients used for calculation of the central pixel variable $Y_0$ as the processing coefficients, it is possible to use pixel values of peripheral images to calculate any pixel values having motion blur removed.

Figure 21:
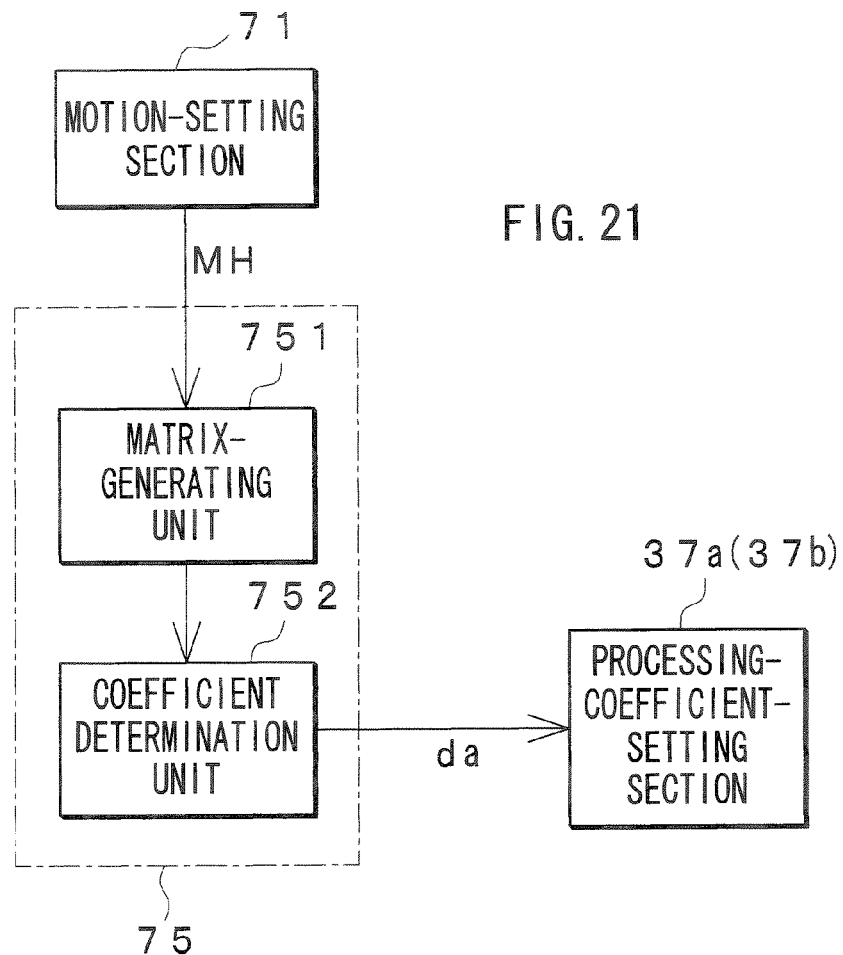
FIG. 21 is a functional block diagram of a coefficient-generating apparatus.

FIG. 21 is a functional block diagram of a coefficient generation apparatus that generates processing coefficients by using model equations. A motion-setting section 71 sets a motion direction and a motion amount and supplies a matrix-generating unit 751 with motion information MH that indicates the set motion direction and motion amount.

The matrix-generating unit 751 in a processing-coefficient-generating section 75, based on the motion information MH, constructs a model constituted of at least two images to each of which a motion blur is added, to generate a matrix based on accumulation characteristics of pixel values of peripheral pixels in two images that have roughly the same space position as that of a target pixel located between two images, for example, a (t−1) frame image and a (t) frame image or (t−1) field and (t) field and a constraint of "inter-adjacent pixel difference=0".

The following will describe a method of generating processing coefficients in a case of, for example, a motion amount v=5. In this case, such a model as shown in FIG. 6 is constructed, to generate a matrix. Since main terms correspond to pixels having pixel values $X_{-3}$, $X_{-2}$, $X_2$, and $X_3$, the matrix can be expressed as Equation 14.

$$
\left[\begin{array}{cccccccccccccccc}
0 & 0 & 0 & 1/v & 1/v & 1/v & 1/v & 1/v & 0 & 0 & 0 & 0 & 0 & 0 & 0 & 0 \\
0 & 0 & 0 & 0 & 1/v & 1/v & 1/v & 1/v & 1/v & 0 & 0 & 0 & 0 & 0 & 0 & 0 \\
0 & 0 & 0 & 0 & 0 & 0 & 0 & 0 & 1/v & 1/v & 1/v & 1/v & 1/v & 0 & 0 & 0 \\
0 & 0 & 0 & 0 & 0 & 0 & 0 & 0 & 1/v & 1/v & 1/v & 1/v & 1/v & 0 & 0 & 0 \\
\hline
1 & -1 & 0 & 0 & 0 & 0 & 0 & 0 & 0 & 0 & 0 & 0 & 0 & 0 & 0 & 0 \\
0 & 1 & -1 & 0 & 0 & 0 & 0 & 0 & 0 & 0 & 0 & 0 & 0 & 0 & 0 & 0 \\
0 & 0 & 1 & -1 & 0 & 0 & 0 & 0 & 0 & 0 & 0 & 0 & 0 & 0 & 0 & 0 \\
0 & 0 & 0 & 1 & -1 & 0 & 0 & 0 & 0 & 0 & 0 & 0 & 0 & 0 & 0 & 0 \\
0 & 0 & 0 & 0 & 1 & -1 & 0 & 0 & 0 & 0 & 0 & 0 & 0 & 0 & 0 & 0 \\
0 & 0 & 0 & 0 & 0 & 1 & -1 & 0 & 0 & 0 & 0 & 0 & 0 & 0 & 0 & 0 \\
0 & 0 & 0 & 0 & 0 & 0 & 1 & -1 & 0 & 0 & 0 & 0 & 0 & 0 & 0 & 0 \\
0 & 0 & 0 & 0 & 0 & 0 & 0 & 1 & -1 & 0 & 0 & 0 & 0 & 0 & 0 & 0 \\
0 & 0 & 0 & 0 & 0 & 0 & 0 & 0 & 1 & -1 & 0 & 0 & 0 & 0 & 0 & 0 \\
0 & 0 & 0 & 0 & 0 & 0 & 0 & 0 & 0 & 1 & -1 & 0 & 0 & 0 & 0 & 0 \\
0 & 0 & 0 & 0 & 0 & 0 & 0 & 0 & 0 & 0 & 1 & -1 & 0 & 0 & 0 & 0 \\
0 & 0 & 0 & 0 & 0 & 0 & 0 & 0 & 0 & 0 & 0 & 1 & -1 & 0 & 0 & 0 \\
0 & 0 & 0 & 0 & 0 & 0 & 0 & 0 & 0 & 0 & 0 & 0 & 1 & -1 & 0 & 0 & 0
\end{array}\right]
\begin{bmatrix} Y_{-8} \\ Y_{-7} \\ Y_{-6} \\ Y_{-5} \\ Y_{-4} \\ Y_{-3} \\ Y_{-2} \\ Y_{-1} \\ Y_0 \\ Y_1 \\ Y_2 \\ Y_3 \\ Y_4 \\ Y_5 \\ Y_6 \\ Y_7 \\ Y_8 \end{bmatrix}
=
\begin{bmatrix} X_{-3} \\ X_{-2} \\ X_2 \\ X_3 \\ \hline 0 \\ 0 \\ 0 \\ 0 \\ 0 \\ 0 \\ 0 \\ 0 \\ 0 \\ 0 \\ 0 \\ 0 \\ 0 \end{bmatrix}
\quad (14)
$$

It is thus possible to uniquely obtain a matrix to obtain $Y_0$ as indicated in the Equation 10. In other words, it is possible to obtain processing coefficients (matrix) to be linearly combined with the pixel values $X_{-3}$, $X_{-2}$, $X_2$, and $X_3$ of the main terms in a case of the motion amount $v=5$. Although the above equation has added constraint equations so that unknown numbers Y may agree with the number of the equations, further constraint equation (s) may be added to establish a relationship of "unknown numbers Y<number of equations", as indicated in the Equation 7, thereby obtaining processing coefficients by using the least-squares method. Thus, the matrix-generating unit 751 can generate a matrix for each motion amount as describe above so that a coefficient determination unit 752 can obtain processing coefficients for each motion amount. Further, in a case of the motion amount $v=4$, pixel values of the main terms are of $X_{-3}$, $X_{-2}$, $X_{-1}$, $X_1$, $X_2$, and $X_3$, thereby obtaining a matrix as that indicated in Equation 15.

$$\left[\begin{array}{cccccccccccccccc}
0 & 0 & 0 & 0 & 0 & 0 & 1/v & 1/v & 1/v & 1/v & 1/v & 1/v & 1/v & 1/v & 0 & 0 \\
0 & 0 & 0 & 0 & 0 & 0 & 0 & 0 & 1/v & 1/v & 1/v & 1/v & 1/v & 1/v & 1/v & 1/v \\
0 & 0 & 0 & 0 & 0 & 0 & 0 & 0 & 0 & 0 & 1/v & 1/v & 1/v & 1/v & 1/v & 1/v \\
0 & 0 & 0 & 0 & 0 & 0 & 0 & 0 & 0 & 0 & 0 & 0 & 0 & 0 & 1/v & 1/v \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\ \hline
1 & -1 & 0 & 0 & 0 & 0 & 0 & 0 & 0 & 0 & 0 & 0 & 0 & 0 & 0 & 0 \\
0 & 1 & -1 & 0 & 0 & 0 & 0 & 0 & 0 & 0 & 0 & 0 & 0 & 0 & 0 & 0 \\
0 & 0 & 1 & -1 & 0 & 0 & 0 & 0 & 0 & 0 & 0 & 0 & 0 & 0 & 0 & 0 \\
0 & 0 & 0 & 1 & -1 & 0 & 0 & 0 & 0 & 0 & 0 & 0 & 0 & 0 & 0 & 0 \\
0 & 0 & 0 & 0 & 1 & -1 & 0 & 0 & 0 & 0 & 0 & 0 & 0 & 0 & 0 & 0 \\
0 & 0 & 0 & 0 & 0 & 1 & -1 & 0 & 0 & 0 & 0 & 0 & 0 & 0 & 0 & 0 \\
0 & 0 & 0 & 0 & 0 & 0 & 1 & -1 & 0 & 0 & 0 & 0 & 0 & 0 & 0 & 0 \\
0 & 0 & 0 & 0 & 0 & 0 & 0 & 1 & -1 & 0 & 0 & 0 & 0 & 0 & 0 & 0 \\
0 & 0 & 0 & 0 & 0 & 0 & 0 & 0 & 1 & -1 & 0 & 0 & 0 & 0 & 0 & 0 \\
0 & 0 & 0 & 0 & 0 & 0 & 0 & 0 & 0 & 1 & -1 & 0 & 0 & 0 & 0 & 0 \\
0 & 0 & 0 & 0 & 0 & 0 & 0 & 0 & 0 & 0 & 1 & -1 & 0 & 0 & 0 & 0 \\
0 & 0 & 0 & 0 & 0 & 0 & 0 & 0 & 0 & 0 & 0 & 1 & -1 & 0 & 0 & 0 \\
0 & 0 & 0 & 0 & 0 & 0 & 0 & 0 & 0 & 0 & 0 & 0 & 1 & -1 & 0 & 0 \\
0 & 0 & 0 & 0 & 0 & 0 & 0 & 0 & 0 & 0 & 0 & 0 & 0 & 1 & -1 & 0 \\
0 & 0 & 0 & 0 & 0 & 0 & 0 & 0 & 0 & 0 & 0 & 0 & 0 & 0 & 1 & -1 \\
0 & 0 & 0 & 0 & 0 & 0 & 0 & 0 & 0 & 0 & 0 & 0 & 0 & 0 & 0 & 1 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0
\end{array}\right] \quad (35)$$

-continued $$\left(\begin{array}{cccccccccccccccc} 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 1/v & 1/v & 0 & 0 & 0 & 0 & 0 & 0 & 0 & 0 & 0 & 0 & 0 & 0 & 0 & 0 \\ 1/v & 1/v & 1/v & 1/v & 1/v & 1/v & 0 & 0 & 0 & 0 & 0 & 0 & 0 & 0 & 0 & 0 \\ 1/v & 1/v & 1/v & 1/v & 1/v & 1/v & 1/v & 1/v & 0 & 0 & 0 & 0 & 0 & 0 & 0 & 0 \\ 0 & 0 & 1/v & 1/v & 1/v & 1/v & 1/v & 1/v & 1/v & 1/v & 0 & 0 & 0 & 0 & 0 & 0 \\ \hline 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ -1 & 0 & 0 & 0 & 0 & 0 & 0 & 0 & 0 & 0 & 0 & 0 & 0 & 0 & 0 & 0 \\ 1 & -1 & 0 & 0 & 0 & 0 & 0 & 0 & 0 & 0 & 0 & 0 & 0 & 0 & 0 & 0 \\ 0 & 1 & -1 & 0 & 0 & 0 & 0 & 0 & 0 & 0 & 0 & 0 & 0 & 0 & 0 & 0 \\ 0 & 0 & 1 & -1 & 0 & 0 & 0 & 0 & 0 & 0 & 0 & 0 & 0 & 0 & 0 & 0 \\ 0 & 0 & 0 & 1 & -1 & 0 & 0 & 0 & 0 & 0 & 0 & 0 & 0 & 0 & 0 & 0 \\ 0 & 0 & 0 & 0 & 1 & -1 & 0 & 0 & 0 & 0 & 0 & 0 & 0 & 0 & 0 & 0 \\ 0 & 0 & 0 & 0 & 0 & 1 & -1 & 0 & 0 & 0 & 0 & 0 & 0 & 0 & 0 & 0 \\ 0 & 0 & 0 & 0 & 0 & 0 & 1 & -1 & 0 & 0 & 0 & 0 & 0 & 0 & 0 & 0 \\ 0 & 0 & 0 & 0 & 0 & 0 & 0 & 1 & -1 & 0 & 0 & 0 & 0 & 0 & 0 & 0 \\ 0 & 0 & 0 & 0 & 0 & 0 & 0 & 0 & 1 & -1 & 0 & 0 & 0 & 0 & 0 & 0 \end{array}\right) \left[\begin{array}{c} Y_{-7b} \\ Y_{-7a} \\ Y_{-6b} \\ Y_{-6a} \\ Y_{-5b} \\ Y_{-5a} \\ Y_{-4b} \\ Y_{-4a} \\ Y_{-3b} \\ Y_{-3a} \\ Y_{-2b} \\ Y_{-2a} \\ Y_{-1b} \\ Y_{-1a} \\ Y_{0b} \\ Y_{0a} \\ Y_{1b} \\ Y_{1a} \\ Y_{2b} \\ Y_{2a} \\ Y_{3b} \\ Y_{3a} \\ Y_{4b} \\ Y_{4a} \\ Y_{5b} \\ Y_{5a} \\ Y_{6b} \\ Y_{6a} \\ Y_{7b} \\ Y_{7a} \\ Y_{8b} \\ Y_{8a} \end{array}\right] = \left[\begin{array}{c} X_{-3} \\ X_{-2} \\ X_{-1} \\ X_{1} \\ X_{2} \\ X_{3} \\ 0 \\ 0 \\ 0 \\ 0 \\ 0 \\ 0 \\ 0 \\ 0 \\ 0 \\ 0 \\ 0 \\ 0 \\ 0 \\ 0 \\ 0 \\ 0 \\ 0 \\ 0 \\ 0 \\ 0 \\ 0 \\ 0 \\ 0 \\ 0 \end{array}\right]$$

It is to be noted that if the motion amount v is as much as an even number of pixels and the virtual divisor is increased by two as shown in FIG. 9B, it is possible to obtain the value having its phase centered time-wise by obtaining and storing not only the processing coefficients corresponding to $Y_0$ but also the processing coefficients corresponding to $Y_1$ into the processing-coefficient-setting section.

Figure 22:
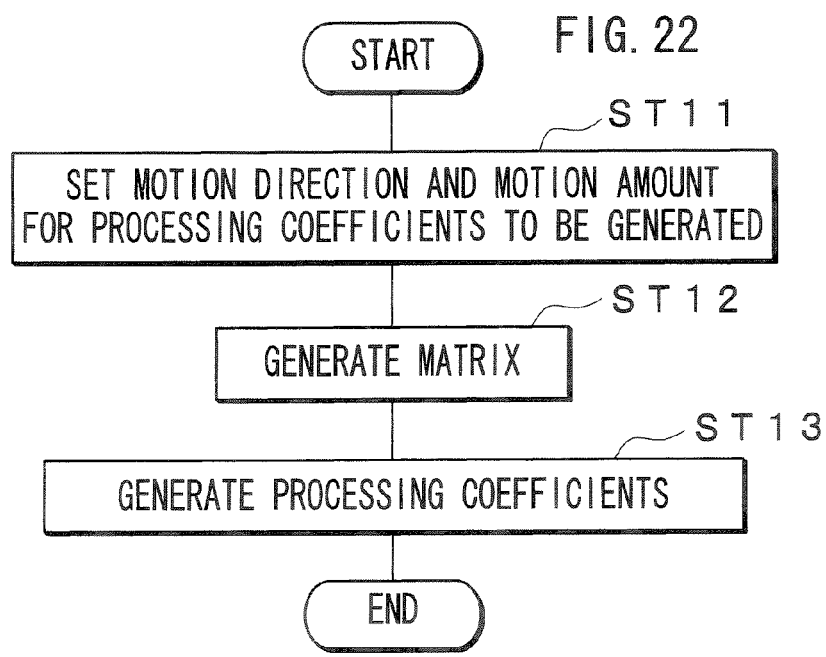
FIG. 22 is a flowchart for showing coefficient-generating processing.

FIG. 22 is a flowchart for showing coefficient-generating processing by using model equations. At step ST11, a motion direction and a motion amount for processing coefficients to be generated are set.

At step ST12, a matrix is generated. As for the generation of the matrix, as described above, the model in which a motion blur is added to the images is constructed, so that the matrix indicating accumulation characteristics can be generated by introducing a constraint of inter-adjacent pixel difference=0. At step ST13, the coefficients to be used for calculation of the target pixel based on the matrix generated at the step ST12 and the motion direction and they are set as the processing coefficients.

Figure 23:
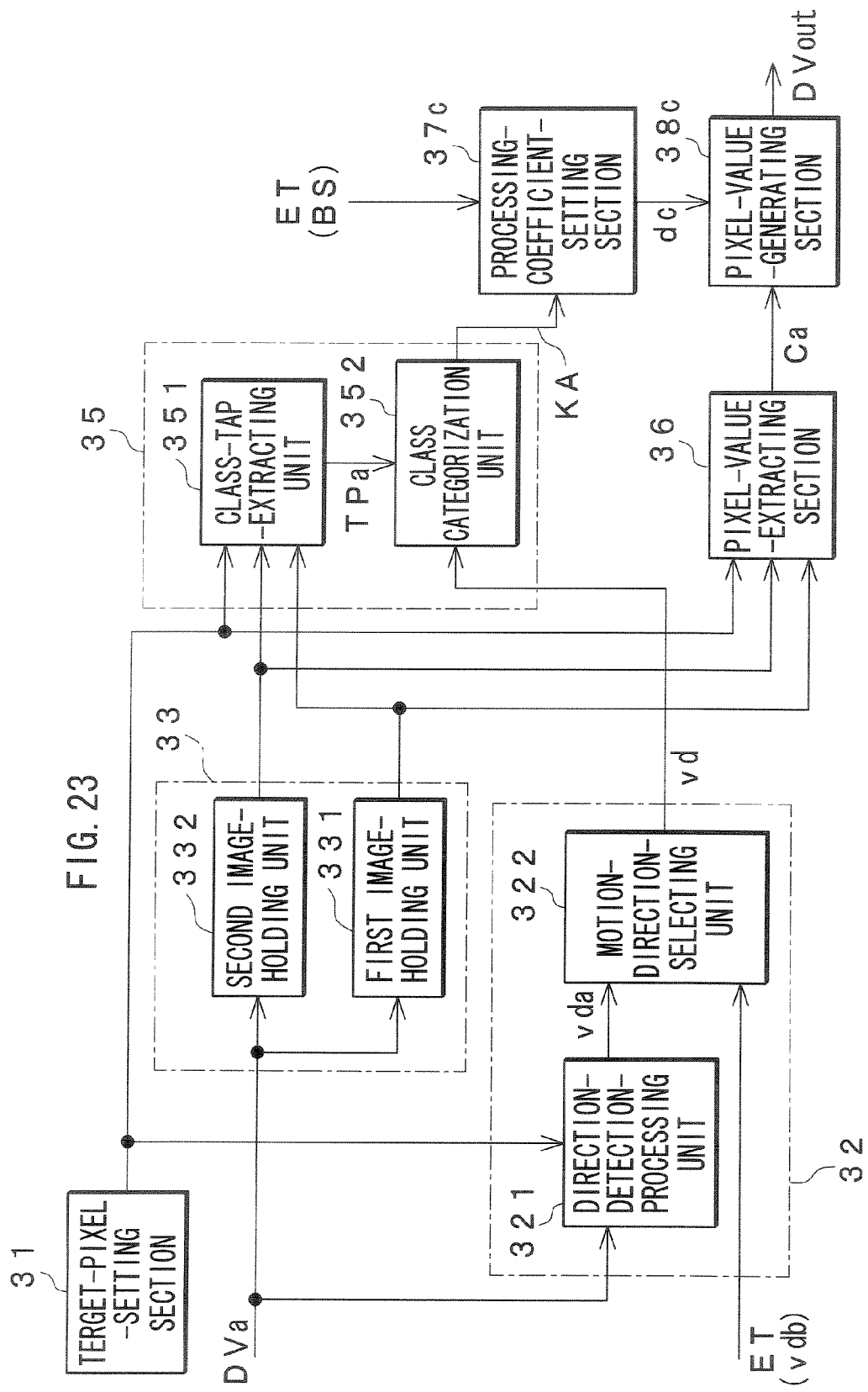
FIG. 23 is further functional block diagram of the image-processing apparatus.

The following will describe cases of obtaining processing coefficients through learning to perform motion blur removing by using the processing coefficients thus obtained through this learning. FIG. 23 shows a configuration of an image-processing apparatus 20 that performs motion blur removing by using the processing coefficients obtained through the learning. It is to be noted that components of FIG. 23 that correspond to those of FIG. 15 or 18 are indicated by the same symbols, detailed descriptions of which will be omitted.

A class-tap-extracting unit 351 of a class-determining section 35 extracts class taps from the peripheral images held on the first image-holding unit 331 and the second image-holding unit 332 based on their space positions corresponding to the target pixel, and supplies the extracted class taps TPa to a class categorization unit 352.

Figure 24A:
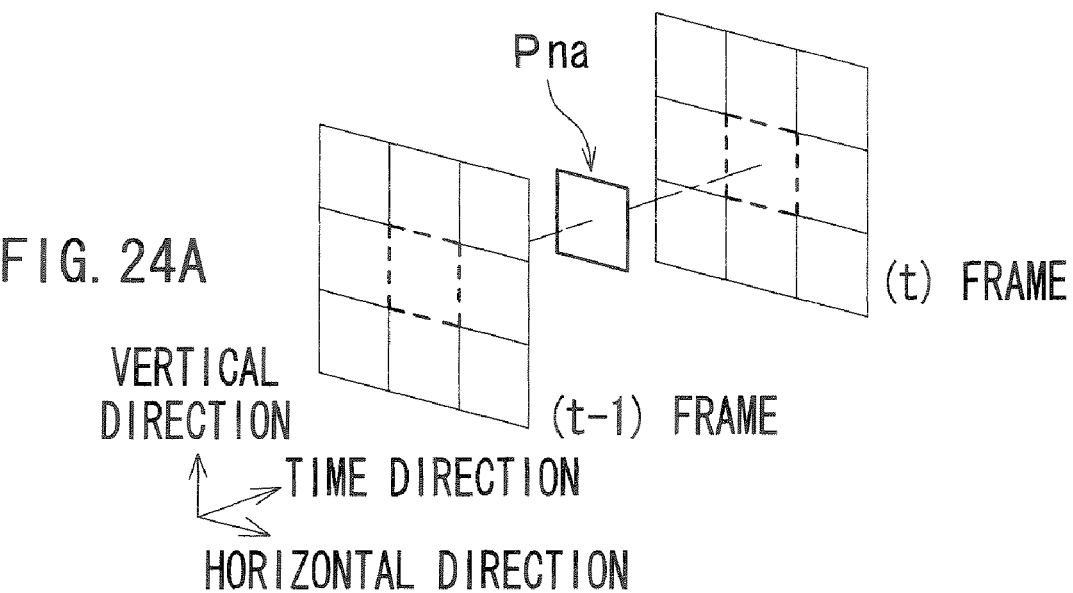
FIGS. 24A and 24B are diagrams each for showing class taps.
Figure 24B:
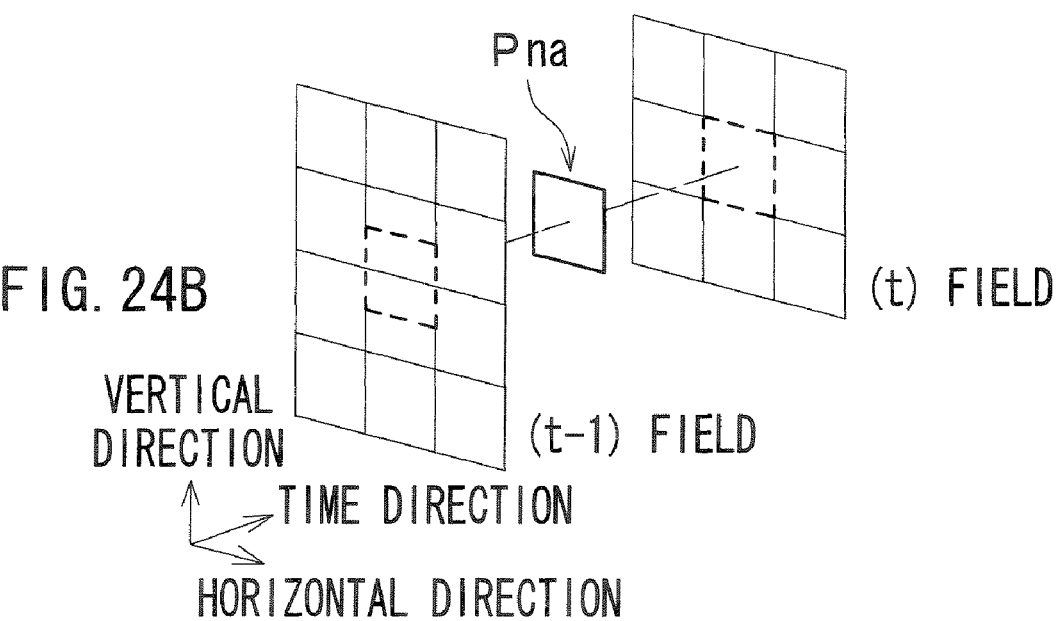

FIGS. 24A and 24B show the class taps. If the image signal DVa has a progressive format, the class-tap-extracting unit 351 extracts from each of the images of (t−1) frame and (t) frame, which are the peripheral images, for example, a total of nine pixels including a pixel at a space position corresponding to that of the target pixel Pna and adjacent pixels around this pixel as each of the class taps based on the space positions corresponding to the target pixel Pna as shown in FIG. 24A. If the image signal DVa has an interlace format, the class-tap-extracting unit 351 extracts from the image of (t) field, which is the peripheral image, for example, a total of nine pixels including a pixel at a space position corresponding to that of the target pixel Pna and adjacent pixels around this pixel as the class tap based on the space position corresponding to the target pixel Pna as shown in FIG. 24B. Further, it extracts from the image of (t−1) field, which is the peripheral image, for example, a total of twelve pixels including pixels that contain a space position corresponding to that of the target pixel Pna and adjacent pixels around these pixels as the class tap.

The class categorization unit 352 performs class categorization based on the motion direction information vd supplied from the motion-direction-detecting section 32 and the class taps TPa extracted by the class-tap-extracting unit 351 to determine a class code KA and supplies it to a processing-coefficient-setting section 37c.

Herein, if performing the class categorization using the class taps TPa extracted by the class-tap-extracting unit 351, the class categorization is performed based on an activity that is calculated from the class taps TPa.

Figure 25:
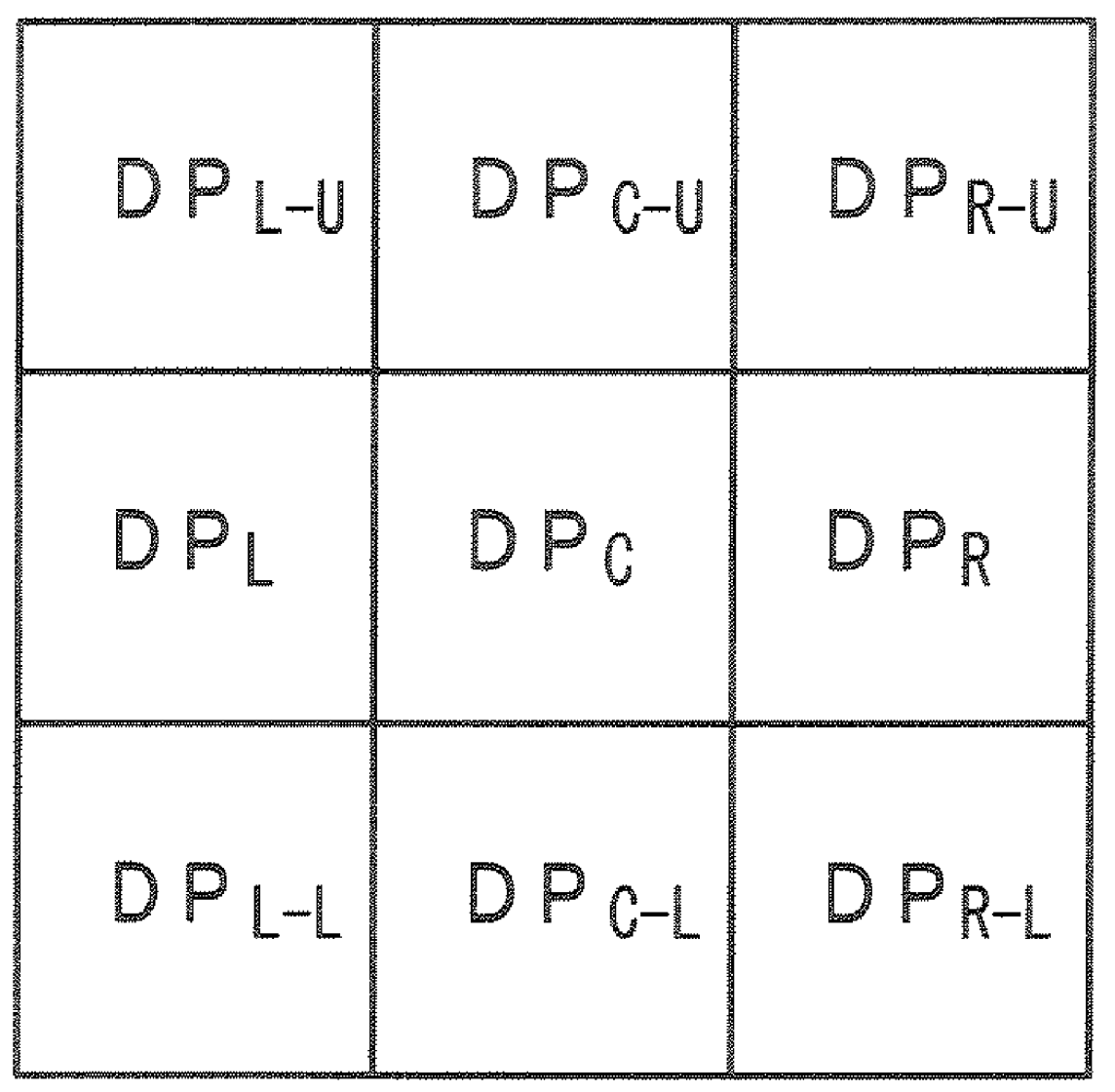

The activity refers to a sum of differences among pixels adjacent to each other, or indicates a space correlation therebetween. When selecting the class taps as shown in FIG. 24A, the activity is differences among total of nine pixels (3×3 pixels) adjacent to each other. Further, when selecting the class taps as (t−1) field shown in FIG. 24B, the activity is differences among total of twelve pixels (4×3 pixels) adjacent to each other. For example, if extracting the class tap as shown in FIG. 25, the activity AC can be calculated based on Equation 16 when character described in each cell indicating the pixel is set as the pixel value. It is to be noted that the higher a space correlation is, value of activity AC is small while the lower a space correlation is, the value of activity AC is large.

$$AC = |DP_{L-U} - DP_{C-U}| + |DP_{C-U} - DP_{L-U}| + |DP_L - DP_C| + \quad (16)$$
$$|DP_C - DP_R| + |DP_{L-L} - DP_{C-L}| + |DP_{C-L} - DP_{R-L}| +$$
$$|DP_{L-U} - DP_L| + |DP_L - DP_{L-L}| + |DP_{C-U} - DP_C| +$$
$$|DP_C - DP_{C-L}| + |DP_{R-U} - DP_R| + |DP_R - DP_{R-L}|$$

Thus, by using activity ACt−1 calculated from the class taps that are extracted from the peripheral images held on the first image-holding unit 331 and activity ACt calculated from the class taps that are extracted from the peripheral images held on the second image-holding unit 332, activity class AL is determined as equation 17.

$$\text{Activity class } AL = ACt/(ACt-1+Act) \times 100 \quad (17)$$

Further, the class code KA is determined based on the motion direction information vd and the activity class AL.

The pixel-value-extracting section 36 extracts, in order to extract a main term that mainly contains components of a target pixel, at least pixels whose space positions roughly agree with that of the target pixel Pna, from the peripheral images which are held in the first image-holding unit 331 and the second image-holding unit 332, and supplies them to a pixel-value-generating section 38c as prediction taps Ca.

Figure 26A:
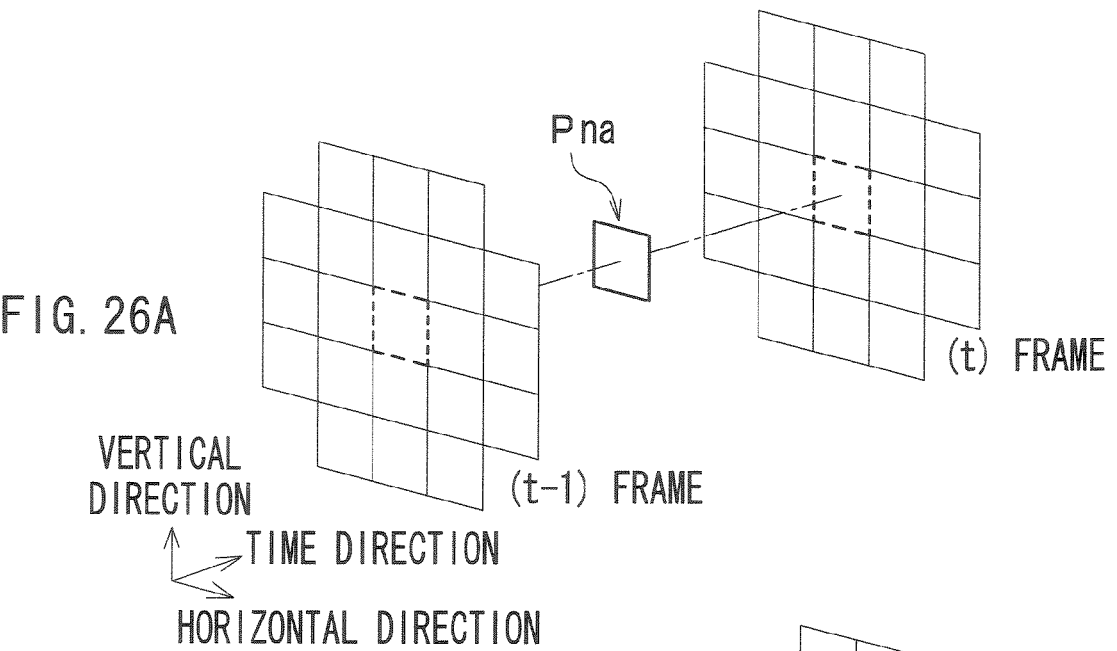
FIGS. 26A and 26B are diagrams each for showing prediction taps.
Figure 26B:
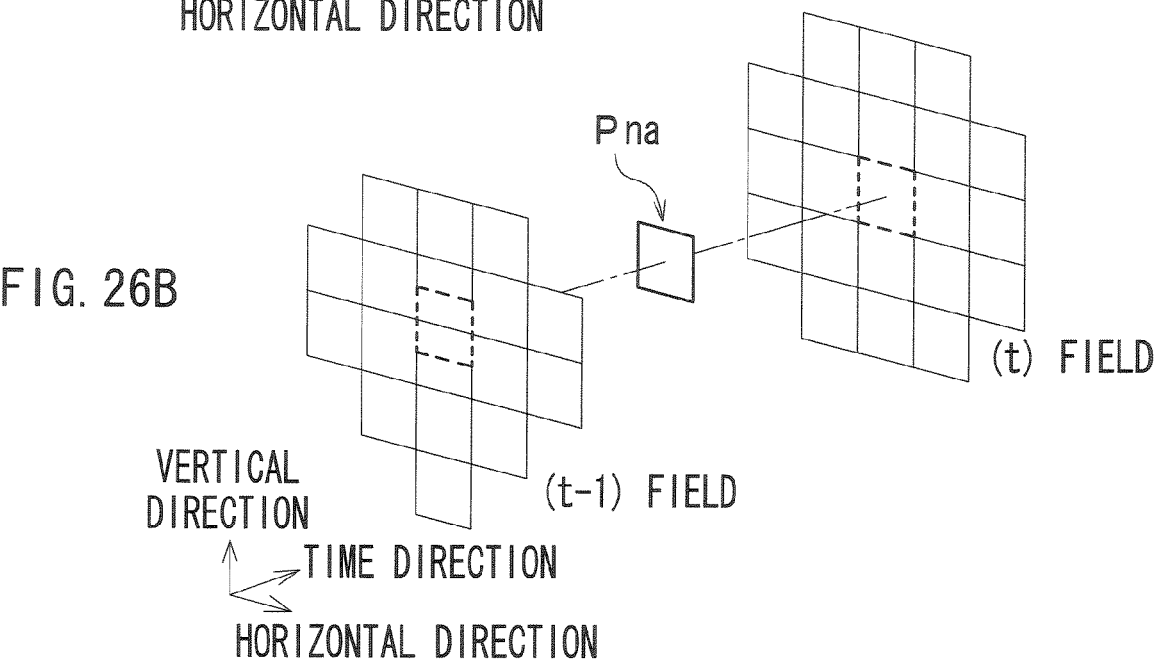

FIGS. 26A and 26B show the prediction taps. If the image signal DVa has a progressive format, the pixel-value-extracting section 36 extracts from each of the images of (t−1) frame and (t) frame, which are the peripheral images, for example, a total of twenty-one pixels as the prediction taps based on pixels whose space positions roughly agree with that of the target pixel Pna, as shown in FIG. 26A. If the image signal DVa has an interlace format, pixel-value-extracting section 36 extracts from the image of (t) field, which is the peripheral image, a total of twenty-one pixels as the prediction tap based on a pixel whose space position agrees with that of the target pixel Pna, as shown in FIG. 24B as well as it extracts from the image of (t−1) field, which is the peripheral image, a total of seventeen pixels as the prediction tap based on a pixel whose space position agrees with that of the target pixel Pna.

The processing-coefficient-setting section 37c stores beforehand the blur-removing-processing coefficients at least for each class code. In other words, it stores beforehand the specific processing coefficients or the processing coefficients corresponding to the motion direction for each class code. Further, the processing-coefficient-setting section 37c selects the processing coefficients dc corresponding to at least the class code supplied from the class categorization unit 352 and supplies them to the pixel-value-generating section 38c. Alternatively, when receiving the adjustment information BS that can adjust motion blur as information ET from outside, the processing-coefficient-setting section 37c switches the processing coefficients to be selected based on this adjustment information BS to adjust motion-blur-removing effects. For example, even if a motion blur cannot optimally be removed by using the processing coefficients dc corresponding to the class code KA, it is possible to remove the motion blur optimally by switching the processing coefficients to other. Further, by switching the processing coefficients, a motion blur can be left intentionally.

The pixel-value-generating section 38c performs calculation processing by using the prediction taps Ca supplied from the pixel-value-extracting section 36 and the processing coefficients dc supplied from the processing-coefficient-setting section 37 to generate the pixel values of target pixels in the target images. For example, it performs multiply and accumulation calculation of the prediction taps extracted from the peripheral images held on the first image-holding unit 331 and the processing coefficients to generate a pixel value. It also performs multiply and accumulation calculation of the prediction taps extracted from the peripheral images held on the second image-holding unit 332 and the processing coefficients to generate a pixel value. By integrating these two pixel values, a pixel value of the target pixel is generated and outputted as the image signal DVout. Herein, if the specific processing coefficients corresponding to the class code are supplied to the pixel-value-generating section 38c, the motion direction information vd is also supplied to the pixel-value-generating section 38c, similar to FIG. 15, which generates the pixel values for processing as in a case of the pixel-value-generating section 38a. Alternatively, if the processing coefficients corresponding to the motion direction are stored in the processing-coefficient-setting section 37c for each class code, the motion direction information vd is also supplied to the processing-coefficient-setting section 37c, which supplies the pixel-value-generating section 38c with the motion direction indicated by the motion direction information vd and the processing coefficients corresponding to the class code.

Thus, by generating the pixel value of the target pixel in the target image by using the pixel values of the main terms of the plural peripheral images, any deterioration on performance for removing the motion blur can be mitigated even if the motion vector of the target pixel cannot be accurately detected, so that it is possible to perform very robust motion blur removing against any shifts in detection of motion vector.

Figure 27:
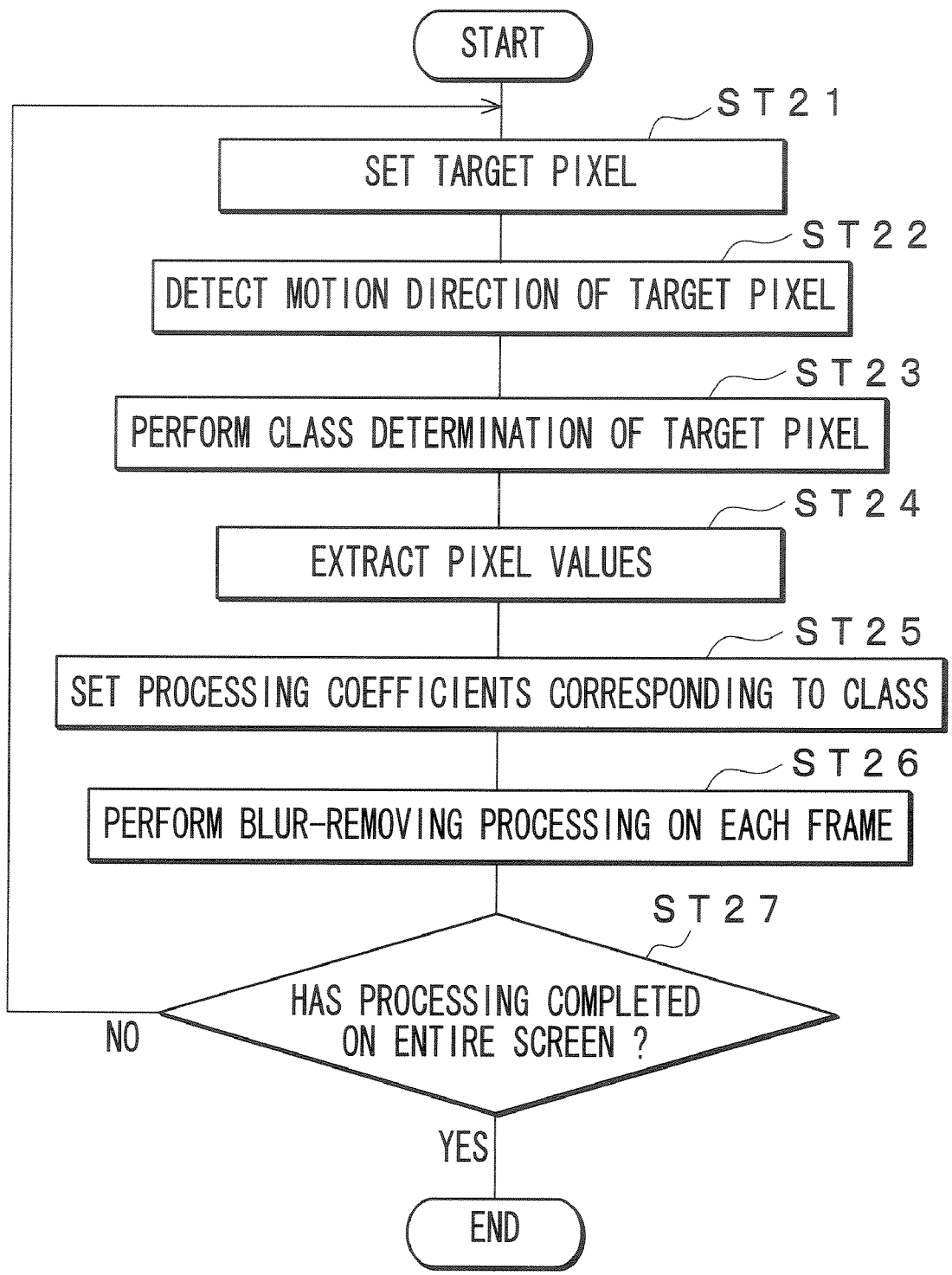
FIG. 27 is a flowchart of image processing in class determination.

FIG. 27 shows a flowchart when image processing is performed by use of software. At step ST21, the CPU 201 sets a target pixel whose motion blur is to be removed and then proceeds to step ST22. At the step ST22, the CPU 201 detects the motion direction of the target pixel and then, proceeds to step ST 23. At the step ST23, the CPU 201 performs class determination on the target pixel. In this class determination, a class categorization is performed based on pixel values of the class taps set on the peripheral images on the basis of the motion direction of the target pixel and space position of the target pixel, so that the class code can be determined. At step ST24, the CPU 201 extracts pixel values so that the pixel values of the prediction taps set on the peripheral images can be extracted. In other words, the CPU 201 sets pixels in the peripheral images whose space position roughly agree with that of the target pixel as at least the prediction taps, in order to extract a main term that mainly contains components of a target pixel in a moving object, and extracts the pixel values in the prediction taps.

At step ST25, the CPU 201 sets the processing coefficients corresponding to the class code and proceeds to step ST26. In this processing coefficient setting, the specific processing coefficients corresponding to the class code are set or the processing coefficients corresponding to the class code and the motion direction detected in the step ST22 are set.

At the step ST26, the CPU 201 performs blur-removing processing on each frame. In other words, the CPU 201 generates a pixel value that correspond to the target pixel based on the pixel values in the prediction taps extracted in the step ST24 and the motion-blur-removing processing coefficients, which correspond to the motion direction and the class code set at the step ST25. Alternatively, it generates new pixel values for processing from the pixel values extracted corresponding to the motion direction, calculates the pixel value corresponding to the target pixel based on the these pixel values for processing and the specific motion-blur-removing processing coefficients corresponding to the class code set at the step ST25, and proceeds to step ST27.

At the step ST27, the CPU 201 decides whether blur-removing processing is completed on entire screen and, if the blur-removing processing is not performed yet on any of the pixels, it returns to the step ST21 while if the blur-removing processing is completed on the entire screen, it ends the processing.

The following will describe cases where the processing coefficients to be stored into the processing-coefficient-setting section are obtained through learning to perform blur-removing processing.

Figure 28:
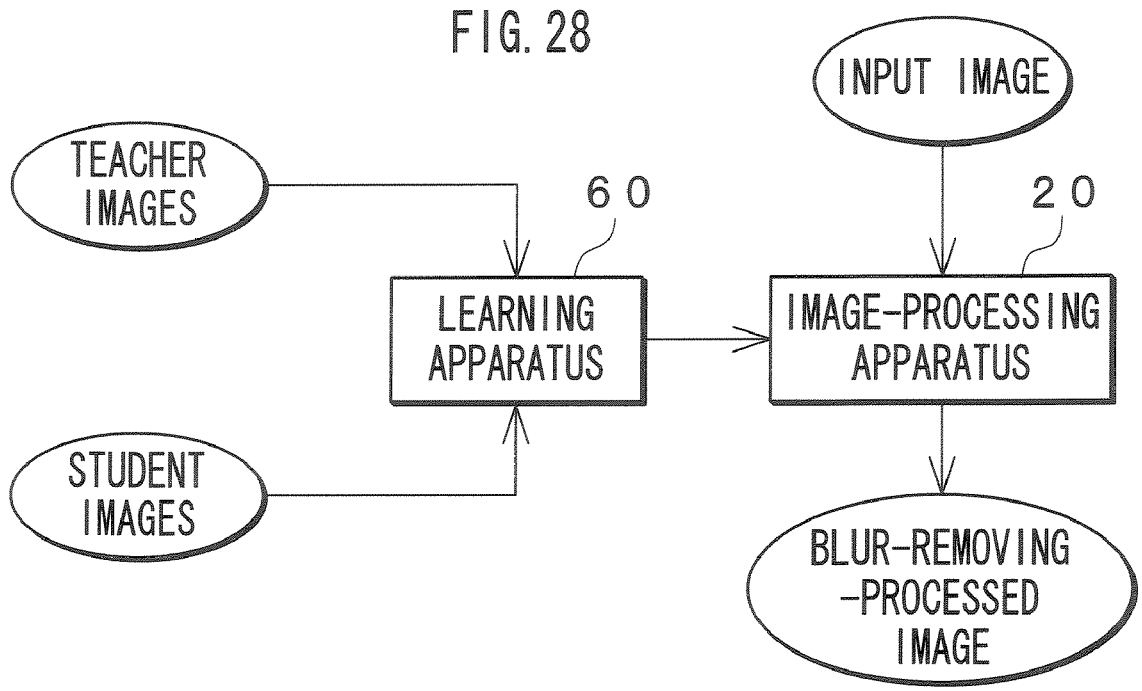
FIG. 28 is a diagram for showing a configuration in a case where blur-removing processing is performed by obtaining processing coefficients through learning.

FIG. 28 shows a configuration in a case where the blur-removing processing is performed by obtaining the processing coefficients through learning. A learning apparatus 60 performs learning processing by using teacher images and student images obtained by adding any motion blurs to each of the teacher images and stores processing coefficients obtained by this learning into the processing-coefficient-setting section in the image-processing apparatus 20. The image-processing apparatus 20 selects the prediction taps from an image containing a motion blur as an input image so that at least the pixels whose space positions roughly agree with that of the target pixel can be contained and performs calculation processing by using the pixel values in the prediction taps and processing coefficients stored in the processing-coefficient-setting section, thereby obtaining a pixel value of the blur-removed target pixel. As the teacher images, images shot by using a high-speed imaging camera or still images are used. The student images are generated by treating the image shot by using a high-speed imaging camera as a still image, and integrating the image time-wise. Alternatively, the student images are generated by setting the motion direction and the motion amount, and adding motion blur and noise corresponding to the set motion direction or motion amount to the still image. Further, by changing the learning sources to the image signal having HD format or the SD format or the like, it is possible to generate the optimal coefficients corresponding to each of the image formats.

Figure 29:
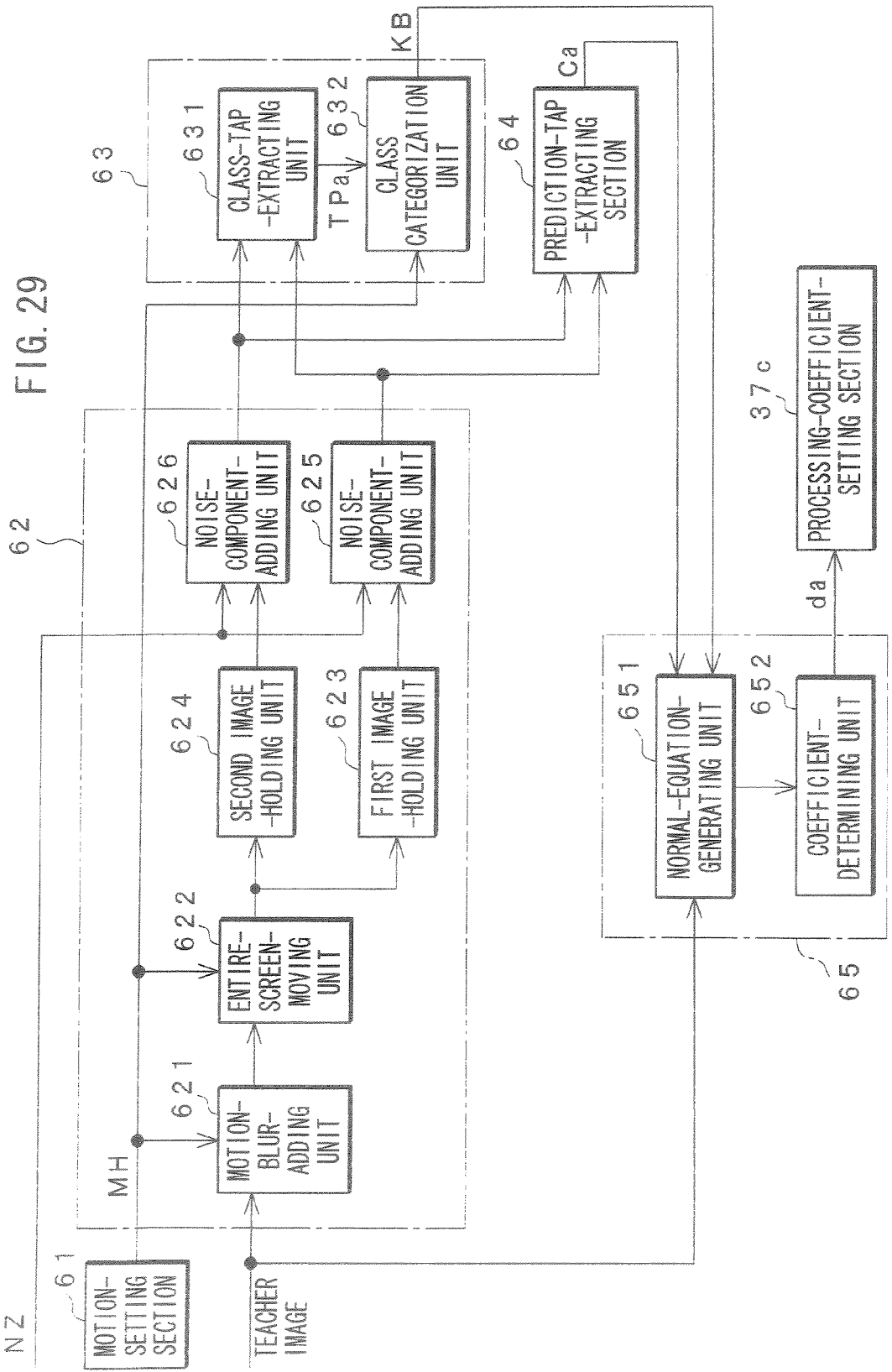
FIG. 29 is a functional block diagram of a learning apparatus.

FIG. 29 shows a functional block diagram of the learning apparatus 60. A motion-setting section 61 sets the motion direction and the motion amount and supplies a student-image-generating section 62 with motion information MH indicative of the set motion direction and motion amount.

A motion-blur-adding unit 621 in the student-image-generating section 62 adds a motion blur corresponding to the motion amount indicated by the motion information MH into each of the teacher images and supplies it to an entire-screen-moving unit 622. The entire-screen-moving unit 622 moves each of the teacher images into which the motion blur is added by an entire screen based on the motion information MH to generate two student images. Herein, these two student images are generated so that the teacher image can have the middle phase between those of the two student images. In other words, the teacher image into which the motion blur is added is moved by a half the motion amount v in a direction opposite to the motion direction indicated by the motion information MH so that a first student image corresponding to, for example, the image of (t−1) frame can be generated. Further, the teacher image into which the motion blur is added is moved by a half the motion amount v in the motion direction indicated by the motion information MH so that a second student image corresponding to, for example, the image of (t) frame can be generated. Thus, generating the student images enables the teacher image to correspond to a target image and the student images to correspond to peripheral images. The first student image generated in the entire-screen-moving unit 622 is stored in the first image-holding unit 623. Further, the second student image generated in the entire-screen-moving unit 622 is stored in the second image-holding unit 624.

Noise-component-adding units 625 and 626 carries noise NZ, which has been carried on the image signal DVa, beforehand on the first and second student images to learn the processing coefficients, in order to be able to perform the motion-blur-removing processing, even if the noise is carried on image signal DVa, without any influence with the noise. Thus, by providing the noise-component-adding units 625 and 626 to perform the learning, it is possible to perform the motion-blur-removing processing accurately with a smaller influence by the noise than a case of not providing the noise-component-adding units 625 and 626 to perform the learning.

A class-determining section 63 determines class code KB to the pixel similar to the above-mentioned class-determining section 35, and supplies it to a normal-equation-generating unit 651 of the processing-coefficient-generating section 65.

The prediction-tap-extracting section 64 extracts prediction taps Ca, similar to the above-mentioned pixel-value-extracting section 36, from the first and second student images that have been generated in the student-image-generating section 62 and supplies the pixel values in the prediction taps to the normal-equation-generating unit 651.

The normal-equation-generating unit 651 of the processing-coefficient-generating section 65 generates a normal equation for each class code from the pixel values in the prediction taps Ca extracted in the prediction-tap-extracting section 64 and the pixel values of the teacher images and supplies it to a coefficient-determining unit 652. The coefficient-determining unit 652 calculates processing coefficients for each student image based on the normal equation supplied from the normal-equation-generating unit 651 and stores the processing coefficients determined for each student image in the processing-coefficient-setting section 37c. In this case, if a motion amount and a motion direction are specified to generate the student images, specific processing coefficients that correspond to the class code are stored in the processing-coefficient-setting section 37c. Further, if a motion direction is switched to generate the student signals, processing coefficients that correspond to at least the motion direction and the class code are stored in the processing-coefficient-setting section 37c.

The following will describe the normal-equation-generating unit 651 and the coefficient-determining unit 652. The above-mentioned pixel-value-generating section 38c performs linear combination indicated by, for example, Equation 18 by using the pixel values in the prediction taps extracted in the pixel-value-extracting section 36 and the processing coefficients supplied from the processing-coefficient-setting section 37c, thereby generating pixel values after blur-removing processing is performed for each peripheral image.

$$q' = \sum_{i=0}^{n} di \times ci \tag{18}$$

In the Equation 18, the term q' indicates pixel values of pixels from which blur is removed. The term, ci (i is an integer of 1 through n, indicating each of the pixels in a processing range) represents pixel values in the processing region. Further, di indicates processing coefficients.

In this Equation 18, before learning, the processing coefficients $d_i$ are respectively undetermined ones. Learning of the processing coefficients is performed by inputting pixels of plural teacher images (still images). In a case where there are m number of pixels of the teacher images and pixel data of the m number of pixels is described as "$q_k$ (k is an integer of 1 through m)", following Equation 19 is derived from the Equation 18.

$$qk \approx \sum_{i=0}^{n} di \times cik = qk' \tag{19}$$

Herein, by calculating a right side, it is possible to obtain blur-removed pixel values $q_k'$, which are approximately equal to actual pixel values $q_k$ containing no motion blur. It is to be noted that an approximately equal symbol, not an equality symbol, is used in the Equation 19 because an error contains therein. In other words, this is because the blur-removed pixel values obtained as a result of calculation of the right side do not strictly agree with pixel value on target pixel in an actual image having no motion blur and contain a predetermined error.

In the Equation 19, a processing coefficient $d_i$ that minimizes a sum of squares of the error, if obtained through learning, is considered to be an optimal coefficient to bring the blur-removed pixel values $q_k$ close to the pixel values having no motion blur. Therefore, for example, by using m (which is an integer larger than n) number of pixel values $q_k$ gathered through the learning, such an optimal processing coefficient $d_i$ is determined according to the least-squares method.

A normal equation to obtain the processing coefficients $d_i$ in the right side of the Equation 19 according to the least-squares method can be given as Equation 20.

$$\begin{bmatrix} \sum_{k=1}^{m} c_{1k} \times c_{1k} & \sum_{k=1}^{m} c_{1k} \times c_{2k} & \cdots & \sum_{k=1}^{m} c_{1k} \times c_{nk} \\ \sum_{k=1}^{m} c_{2k} \times c_{1k} & \sum_{k=1}^{m} c_{2k} \times c_{2k} & \cdots & \sum_{k=1}^{m} c_{2k} \times c_{nk} \\ \vdots & \vdots & & \vdots \\ \sum_{k=1}^{m} c_{nk} \times c_{1k} & \sum_{k=1}^{m} c_{nk} \times c_{2k} & \cdots & \sum_{k=1}^{m} c_{nk} \times c_{nk} \end{bmatrix} \begin{bmatrix} d_1 \\ d_2 \\ \vdots \\ d_n \end{bmatrix} = \begin{bmatrix} \sum_{k=1}^{m} c_{1k} \times q_k \\ \sum_{k=1}^{m} c_{2k} \times q_k \\ \vdots \\ \sum_{k=1}^{m} c_{nk} \times q_k \end{bmatrix} \tag{20}$$

Therefore, by solving the normal equation indicated in the Equation 20, the processing coefficients $d_i$ can be determined. Specifically, if matrixes of the normal equation indicated in the Equation 20 are respectively defined as following Equations 21 to 23, the normal equation is given as following Equation 24.

$$C_{MAT} = \begin{bmatrix} \sum_{k=1}^{m} c_{1k} \times c_{1k} & \sum_{k=1}^{m} c_{1k} \times c_{2k} & \cdots & \sum_{k=1}^{m} c_{1k} \times c_{nk} \\ \sum_{k=1}^{m} c_{2k} \times c_{1k} & \sum_{k=1}^{m} c_{2k} \times c_{2k} & \cdots & \sum_{k=1}^{m} c_{2k} \times c_{nk} \\ \vdots & \vdots & & \vdots \\ \sum_{k=1}^{m} c_{nk} \times c_{1k} & \sum_{k=1}^{m} c_{nk} \times c_{2k} & \cdots & \sum_{k=1}^{m} c_{nk} \times c_{nk} \end{bmatrix} \quad (21)$$

$$D_{MAT} = \begin{bmatrix} d1 \\ d2 \\ M \\ M \\ dn \end{bmatrix} \quad (22)$$

$$Q_{MAT} = \begin{bmatrix} \sum_{k=1}^{m} c_{1k} \times q_k \\ \sum_{k=1}^{m} c_{2k} \times q_k \\ \vdots \\ \sum_{k=1}^{m} c_{nk} \times q_k \end{bmatrix} \quad (23)$$

$$C_{MAT} D_{MAT} = Q_{MAT} \quad (24)$$

As indicated in the Equation 22, elements of the matrix $D_{MAT}$ are the processing coefficients di to be obtained. Therefore, in the Equation 24, once the matrix $C_{MAT}$ on the left side and the matrix $Q_{MAT}$ on the right side are determined, it is possible to calculate the matrix $D_{MAT}$ (i.e., the processing coefficients $d_i$) by any matrix solving methods. Specifically, as indicated in the Equation 21, elements of the matrix $C_{MAT}$ can be calculated if prediction taps $c_{ik}$ are already known. Since the prediction taps $c_{ik}$ are extracted by the prediction-tap-extracting section 64, the normal-equation-generating unit 651 can calculate the elements of matrix $C_{MAT}$ by utilizing the respective prediction taps $c_{ik}$ supplied from the prediction-tap-extracting section 64.

Also, as indicated in the Equation 23, elements of the matrix $Q_{MAT}$ can be calculated if the prediction taps $c_{ik}$ and the pixel values $q_k$ of the still images are already known. The prediction taps $c_{ik}$ are the same as those included in the elements of matrix $C_{MAT}$ and the pixel values $q_k$ correspond to pixels of the teacher images with respect to target pixels (pixels of the student images) contained in each of the prediction taps $c_{ik}$. Therefore, the normal-equation-generating unit 651 can calculate the elements of matrix $Q_{MAT}$ by utilizing the prediction taps $c_{ik}$ supplied from the prediction-tap-extracting section 64 and the teacher images.

Thus, the normal-equation-generating unit 651 calculates the elements of matrixes $C_{MAT}$ and $Q_{MAT}$ and supplies results of the calculations to the coefficient-determining section 652.

The coefficient-determining unit 652 calculates the processing coefficients $d_i$, which are the elements of matrix $D_{MAT}$ of the above-mentioned Equation 22. Specifically, the normal equation of the above-mentioned Equation 24 can be changed into following Equation 25.

$$D_{MAT} = C_{MAT}^{-1} Q_{MAT} \quad (25)$$

In the Equation 25, the elements of matrix $D_{MAT}$ of the left side are the processing coefficients $d_i$ to be obtained. Further, the elements of matrixes $C_{MAT}$ and $Q_{MAT}$ are respectively supplied from the normal-equation-generating unit 651. Therefore, when having been supplied with the respective elements of matrixes $C_{MAT}$ and $Q_{MAT}$ from the normal-equation-generating unit 651, the coefficient-determining unit 652 calculates matrixes of the right side of the Equation 25 to calculate the matrix $D_{MAT}$ and stores a result of the calculation (processing coefficients $d_i$) in the processing-coefficient-setting section 37c. Further, if the above-mentioned learning is performed by changing the motion direction and/or the motion amount in the motion-setting section 61, it is possible to store processing coefficients that correspond to the motion directions and/or the motion amounts in the processing-coefficient-setting section.

Further, the processing coefficients are classified according to the noises that are added in the student-image-generating section and stored in the processing-coefficient-setting section 37c. If the processing coefficients are thus classified according to the noises, it is possible to switch the processing coefficients to be selected by changing the classes based on the adjustment information BS, as described above.

FIG. 30 is a flowchart for showing learning processing performed in the learning apparatus. At step ST31, a motion direction and a motion amount of the processing coefficient to be generated is set.

At step ST32, motion blurs are added so that the motion blurs are added to the teacher images corresponding to the motion direction and the motion amount set at the step ST31.

At step ST33, entire screen moving is performed so that the teacher images to which the motion blurs are added at the step ST32 are entire-screen-moved based on the motion direction and the motion amount set at the step ST31 to generate the student images corresponding to the peripheral images.

At step ST34, noise addition processing is performed so that the noises are added to the student images.

At step ST35, class determination processing is performed so that a class code is determined for each pixel by using the student images to which the noises are added.

At step ST36, prediction taps are extracted from the student images to which the noises are added.

At step ST37, a normal equation is generated for each class using the teacher images and the extracted prediction taps. At step ST38, the normal equation is solved to thereby determine processing coefficients.

At step ST39, it is determined whether the processing is performed on entire screen and, if the processing is not performed yet on the entire screen, processing starting from step ST31 repeats on new pixels while if the processing is completed on the entire screen, the learning processing ends. This enables at least the motion-blur-removing processing coefficients corresponding to the motion direction or the motion amount to be generated. Specifying the motion direction or the motion amount allows the specific processing coefficients corresponding to the class to be generated.

By the way, in generation of the processing coefficients through learning that has been described by using FIGS. 29 and 30, a class has been determined and the processing coefficients corresponding to the class have been generated. On generation of the processing coefficients, however, the teacher image is moved to generate the student images, and then the processing coefficients corresponding to the specific motion direction, the processing coefficients for each motion direction or the processing coefficients including the motion amount can be generated through learning excluding the class determination. If the processing coefficients are generated using the model equations, the processing coefficients can be generated for each specific motion direction or motion amount, the processing coefficients can be generated including the motion amount, and the class is determined and the processing coefficients can be generated for each class.

INDUSTRIAL APPLICABILITY

As described above, an image-processing apparatus, a learning apparatus, a processing-generating apparatus, and their methods according to the present invention may be useful in extracting information embedded into an image signal that can be obtained by pick-up imaging on a real society with an image sensor and be suitable for obtaining an image from which motion blurs are removed.

The invention claimed is:

1. An image-processing apparatus comprising:
a target-pixel-setting section that sets a target pixel in a target image to be predicted;
a motion-direction-detecting section that detects a motion direction corresponding to the target pixel;
a pixel-value-extracting section that extracts from a peripheral image corresponding to the target images in order to extract a main term that mainly contains component of the target pixel in a moving object that encounters a motion blur in the peripheral image, at least a pixel value of pixel in the peripheral image whose space position roughly agrees with space position of the target pixel;
a processing-coefficient-setting section that sets a motion-blur-removing-processing coefficient that to responds to the motion direction detected by the motion-direction-detecting section or sets a specific motion-blur-removing-processing coefficient; and
a pixel-value-generating section having a processor that generates a pixel value that corresponds to the target pixel based on the pixel value extracted by the pixel-value-extracting section and the motion-blur-removing-processing coefficient set by the processing-coefficient-setting section, or newly generates a pixel value for processing from the extracted pixel value that corresponds to the motion direction and generates a pixel value corresponding to the target pixel based on the pixel value for processing and the specific motion-blur-removing-processing coefficient.

2. The image-processing apparatus according to claim 1, comprising a class-determining section that determines a class of the target pixel corresponding to the motion direction,
wherein the processing-coefficient-setting section sets the motion-blur-removing-processing coefficient that corresponds to the class determined by the class-determining section.

3. The image-processing apparatus according to claim 1, wherein the pixel-value-extracting section extracts pixel values of first plural pixels in the peripheral images when the peripheral images have an interlace format; and
wherein the pixel-value-extracting section extracts pixel values of second plural pixels in the peripheral images when the peripheral images have a progressive format.

4. The image-processing apparatus according to claim 2, wherein the class-determining section determines a class of the target pixel corresponding to an activity of pixel values of the pixels in the peripheral images that correspond to the target pixel in the target image.

5. An image-processing method comprising:
a target-pixel-setting step of setting a target pixel in a target image to be predicted;
a motion-direction-detecting step of detecting a motion direction corresponding to the target pixel;
a pixel-value-extracting step of extracting from a peripheral image corresponding to the target image, in order to extract a main to that mainly contains component of the target pixel in a moving object that encounters a motion blur in the peripheral image, at least a pixel value of pixel in the peripheral image whose space position roughly agrees with space position of the target pixel;
a processing-coefficient-setting step of setting a motion-blur-removing-processing coefficient that corresponds to the motion direction detected in the motion-direction-detecting step or setting a specific motion-blur-removing-processing coefficient; and
a pixel-value-generating step of generating a pixel value that corresponds to the target pixel based on the pixel value extracted in the pixel-value-extracting step and the motion-blur-removing-processing coefficient set in the processing-coefficient-setting step, or newly generating a pixel value for processing from the extracted pixel value that corresponds to the motion direction and generating a pixel value corresponding to the target pixel based on the pixel value for processing and the specific motion-blur-removing-processing coefficient.

6. The image-processing method according to claim 5, comprising a class-determining step of determining a class of the target pixel corresponding to the motion direction,
wherein in the processing-coefficient-setting step, the motion-blur-removing-processing coefficient that corresponds to the class determined in the class determination step is set.

7. The image-processing method according to claim 5, wherein in the pixel-value-extracting step, pixel values of first plural pixels in the peripheral images are extracted when the peripheral images have an interlace format; and
wherein in the pixel-value-extracting step, pixel values of second plural pixels in the peripheral images are extracted when the peripheral images have a progressive format.

8. The image-processing method according to claim 6, wherein in the class-determining step, a class of the target pixel is determined corresponding to an activity of pixel values of the pixels in the peripheral images that correspond to the target pixel in the target image.

9. A learning apparatus comprising:
a motion-amount-setting section that sets a motion amount;
a motion-direction-setting section that sets a motion direction;
a student-image-generating section that adds a motion blur to a teacher image based on the motion amount set by the motion-amount-setting section and the motion direction set by the motion-direction-setting section, to generate a student image;
a prediction-tap-extracting section that extracts, in order to extract a main term that mainly contains component of a target pixel in a moving object that encounters a motion blur in the student image, at least a pixel value of pixel in the student image whose space position roughly agrees with space position of the target pixel in the teacher image;
and a processing-coefficient-generating section having a processor that generates a processing coefficient for predicting the target pixel in the teacher image from the pixel value of the pixel extracted from the prediction-tap-extracting section at least for each motion direction or generates a single processing coefficient that corresponds to a specific motion amount and a specific motion direction.

10. The learning apparatus according to claim 9 comprising a class-determining section that determines a class of the target pixel corresponding to the motion direction, wherein the processing-coefficient-generating section generates the processing coefficient that corresponds to the class determined by the class-determining section.

11. The learning apparatus according to claim 9 wherein the student-image-generating section further adds noise to the student image.

12. The learning apparatus according to claim 9 wherein the prediction-tap-extracting section extracts pixel values of first plural pixels in the student images when the student images have an interlace format; and wherein the prediction-tap-extracting section extracts pixel values of second plural pixels in the student images when the student images have a progressive format.

13. The learning apparatus according to claim 10 wherein the class-determining section determines a class of the target pixel corresponding to an activity of pixel values of the pixels in the student images that correspond to the target pixel in the teacher image.

14. A learning method comprising:

a motion-amount-setting step of setting a motion amount;

a motion-direction-setting step of setting a motion direction;

a student-image-generating step of adding a motion blur to a teacher image based on the motion amount set in the motion-amount-setting step and the motion direction set in the motion-direction-setting step, to generate a student image;

a prediction-tap-extracting step of extracting, in order to extract a main term that mainly contains component of the target pixel in a moving object that encounters a motion blur in the student image, at least a pixel value of pixel in the student image whose space position roughly agrees with space position of the target pixel in the teacher image; and a processing-coefficient-generating step of generating a processing coefficient for predicting the target pixel in the teacher image from the pixel value of the pixel extracted in the prediction-tap-extracting step at least for each motion direction or generating a single processing coefficient that corresponds to a specific motion amount and a specific motion direction.

15. The learning method according to claim 14 comprising a class-determining step of determining a class of the target pixel corresponding to the motion direction, wherein in the processing-coefficient-generating step, the processing coefficient is generated from pixel value of the pixel extracted in the prediction-tap-extracting step for each class determined in the class determination step.

16. The learning method according to claim 14 wherein in the student-image-generating step, noise is further added to the student image.

17. The learning method according to claim 14 wherein in the prediction-tap-extracting step, pixel values of first plural pixels in the student images are extracted when the student images have an interlace format; and wherein in the prediction-tap-extracting step, pixel values of second plural pixels in the student images are extracted when the student images have a progressive format.

18. The learning method according to claim 15 wherein in the class-determining step, a class of the target pixel is determined corresponding to an activity of pixel values of the pixels in the student images that correspond to the target pixel in the teacher image.

19. A coefficient-generating apparatus comprising:

a motion-amount-setting section that sets a motion amount;

a motion-direction-setting section that sets a motion direction; and a processing-coefficient-generating section having a processor that constructs a model constituted of at least two images to each of which a motion blur is added based on the motion amount set by the motion-amount-setting section and the motion direction set by the motion-direction-setting section, generates a matrix of accumulation characteristics of pixel values of peripheral pixels in two images that have roughly the same space position as that of a target pixel located between the two images and a constraint of inter-adjacent pixel difference=0, and obtains a coefficient multiplied with the peripheral pixels in which a motion blur occurs when the target pixel from which the motion blur is removed is obtained from the peripheral pixels having motion blur by calculation of the matrix to set it as processing coefficient.

20. A coefficient-generating method comprising:

a motion-amount-setting step of setting a motion amount;

a motion-direction-setting step of setting a motion direction; and a processing-coefficient-generating step of constructing a model constituted of at least two images to each of which a motion blur is added based on the motion amount set in the motion-amount-setting step and the motion direction set in the motion-direction-setting step, generating a matrix of accumulation characteristics of pixel values of peripheral pixels in two images that have roughly the same space position as that of a target pixel located between two images and a constraint of inter-adjacent pixel difference=0, and obtaining a coefficient multiplied with the peripheral pixels in which a motion blur occurs when the target pixel from which the motion blur is removed is obtained from the peripheral pixels having motion blur by calculation of the matrix to set it as processing coefficient.

* * * * *